(12) United States Patent
Wong et al.

(10) Patent No.: US 7,657,777 B2
(45) Date of Patent: Feb. 2, 2010

(54) COMMON SEMANTIC MODEL OF MANAGEMENT OF A SUPPLY CHAIN

(75) Inventors: Michael Kwok-Yui Wong, Toronto (CA); Kezheng Gan, Toronto (CA)

(73) Assignee: Sockeye Solutions Corporation, Ontario (CA)

(*) Notice: Subject to any disclaimer, the term of this patent is extended or adjusted under 35 U.S.C. 154(b) by 154 days.

(21) Appl. No.: 11/607,304

(22) Filed: Dec. 1, 2006

(65) Prior Publication Data

US 2008/0133960 A1 Jun. 5, 2008

(51) Int. Cl.
*G06F 17/30* (2006.01)

(52) U.S. Cl. .............................. 714/2; 707/10; 707/100

(58) Field of Classification Search .................. 705/7, 705/26–28; 707/103, 4, 10, 103 R; 715/234
See application file for complete search history.

(56) References Cited

U.S. PATENT DOCUMENTS

| | | | |
|---|---|---|---|
| 6,954,736 B2 * | 10/2005 | Menninger et al. ............ 705/28 |
| 6,961,728 B2 * | 11/2005 | Wynblatt et al. ............... 707/10 |
| 7,039,606 B2 * | 5/2006 | Hoffman et al. ............... 705/26 |
| 7,130,807 B1 * | 10/2006 | Mikurak ......................... 705/7 |
| 7,210,096 B2 * | 4/2007 | Kearney ....................... 715/234 |
| 7,383,255 B2 * | 6/2008 | Desai et al. ..................... 707/4 |
| 7,430,528 B2 * | 9/2008 | Perkowski ................... 705/27 |
| 2002/0103835 A1 | 8/2002 | Kearney |
| 2002/0188486 A1 | 12/2002 | Gil et al. |
| 2006/0136489 A1 * | 6/2006 | Thome et al. ........... 707/103 R |

FOREIGN PATENT DOCUMENTS

WO   WO-0199008 A1   6/2000

* cited by examiner

*Primary Examiner*—Mohammad Ali
*Assistant Examiner*—Huawen Peng
(74) *Attorney, Agent, or Firm*—Raj Abhyanker LLP

(57) ABSTRACT

A method and apparatus of a supply module having a business object module to least one schema to describe the supply chain data, a XML-based language module to process the at least one schema and a SQL code generator module to sequence of SQL instructions to perform a query of a user where the user the query in the XML-based language.

3 Claims, 24 Drawing Sheets

TRADING ENVIRONMENT 1600    ENVIRONMENT VIEW

| | | | |
|---|---|---|---|
| PROVIDE A DATABASE LANGUAGE 604 | | | |
| STORE A SUPPLY CHAIN DATA IN DATABASE TABLES 606 | | | |
| | MODEL A SUPPLY CHAIN 608 | | |
| | CREATE BUSINESS OBJECTS 610 | | |
| | CREATE XML-BASED LANGUAGE 612 | | |
| | | POPULATE SUPPLY MODULE 100 WITH PREDEFINED SERVICE MODULES, PROCESS MODULES, AND AGENT MODULES 614 | |
| | | | INPUT VALIDATION RULES, REPLENISHMENT RULES, AND POLICIES 616 |
| | | INCORPORATE VALIDATION RULES, REPLENISHMENT RULES, AND POLICIES INTO BUSINESS OBJECTS 618 | |
| | | | DEFINE CUSTOM ALERTS 620 |
| | | BUILD SERVICE MODULES BASED ON CUSTOM ALERTS 622 | |
| MONITOR FOR EVENTS IN THE SUPPLY CHAIN DATA 624 | | | |
| | | | DEFINE PROCESSES, AGENTS, AND RULES FOR SERVICES USING BUSINESS OBJECTS AND XML-BASED LANGUAGE 626 |
| | | BUILD PROCESS MODULES AND AGENT MODULES 628 | |
| | | | DEFINE DYNAMIC FILTERS USING BUSINESS OBJECTS AND XML-BASED LANGUAGE 630 |
| | | | DEFINE CUSTOM VIEWS USING BUSINESS OBJECTS AND XML-BASED LANGUAGE 632 |
| | | INSTANTIATE DYNAMIC FILTERS AND CUSTOM VIEWS 634 | |
| | | | SELECT A TEMPLATE 636 |
| | | | SELECT BUSINESS OBJECTS, SERVICE MODULES, PROCESS MODULES, AND AGENT MODULES 638 |
| | | | SELECT AND EMBED DYNAMIC FILTERS 640 |
| | | | SELECT USER INTERFACE (E.G., VIEW) 642 |
| | | BUILD CUSTOM APPLICATION 644 | |
| CONVERT COMMANDS EXPRESSED IN XML-BASED LANGUAGE INTO INSTRUCTIONS EXPRESSED IN DATABASE LANGUAGE 646 | | | |
| EXECUTE INSTRUCTIONS ON DATABASE 648 | | | |

FIGURE 6   INTERACTION DIAGRAM VIEW

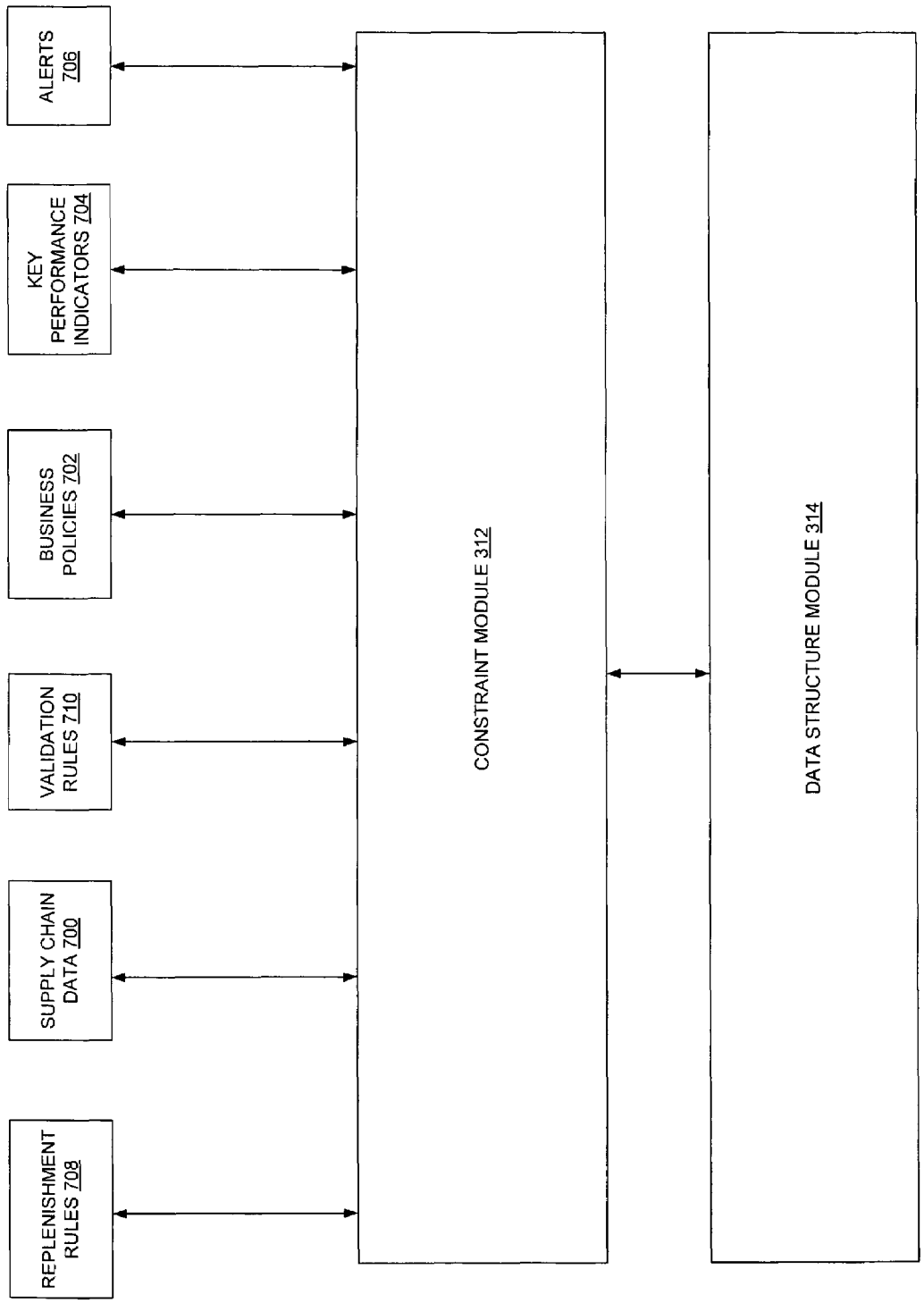
FIGURE 7   EXPLODED VIEW

| PURCHASER 802 | ITEM # 804 | DATE ORDERED 806 | DATE DELIVERED 808 | DELIVERY LOCATION 810 |
|---|---|---|---|---|
| PURCHASE 1 | 33444 | 9/1/06 | 10/1/06 | SITE 3 |
| PURCHASE 2 | 44333 | | | |
| PURCHASE 3 | • | • | • | • |
| • | • | • | • | • |
| • | • | • | • | • |
| • | • | • | • | • |
| • | • | • | • | • |
| PURCHASE N | • | • | • | • |

TABLE VIEW
800

FIGURE 8

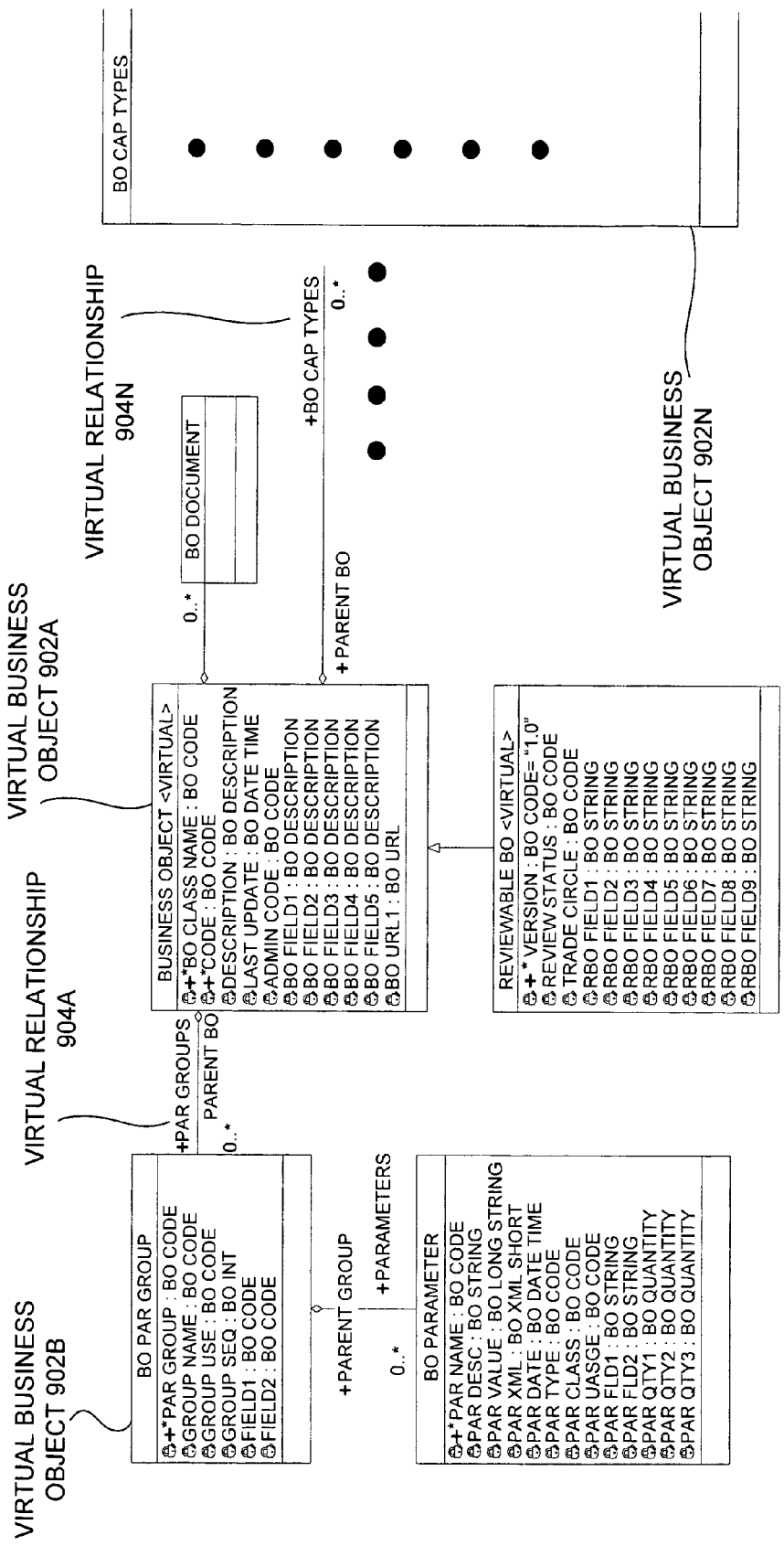
FIGURE 9 — VIRTUAL BUSINESS OBJECT VIEW 900

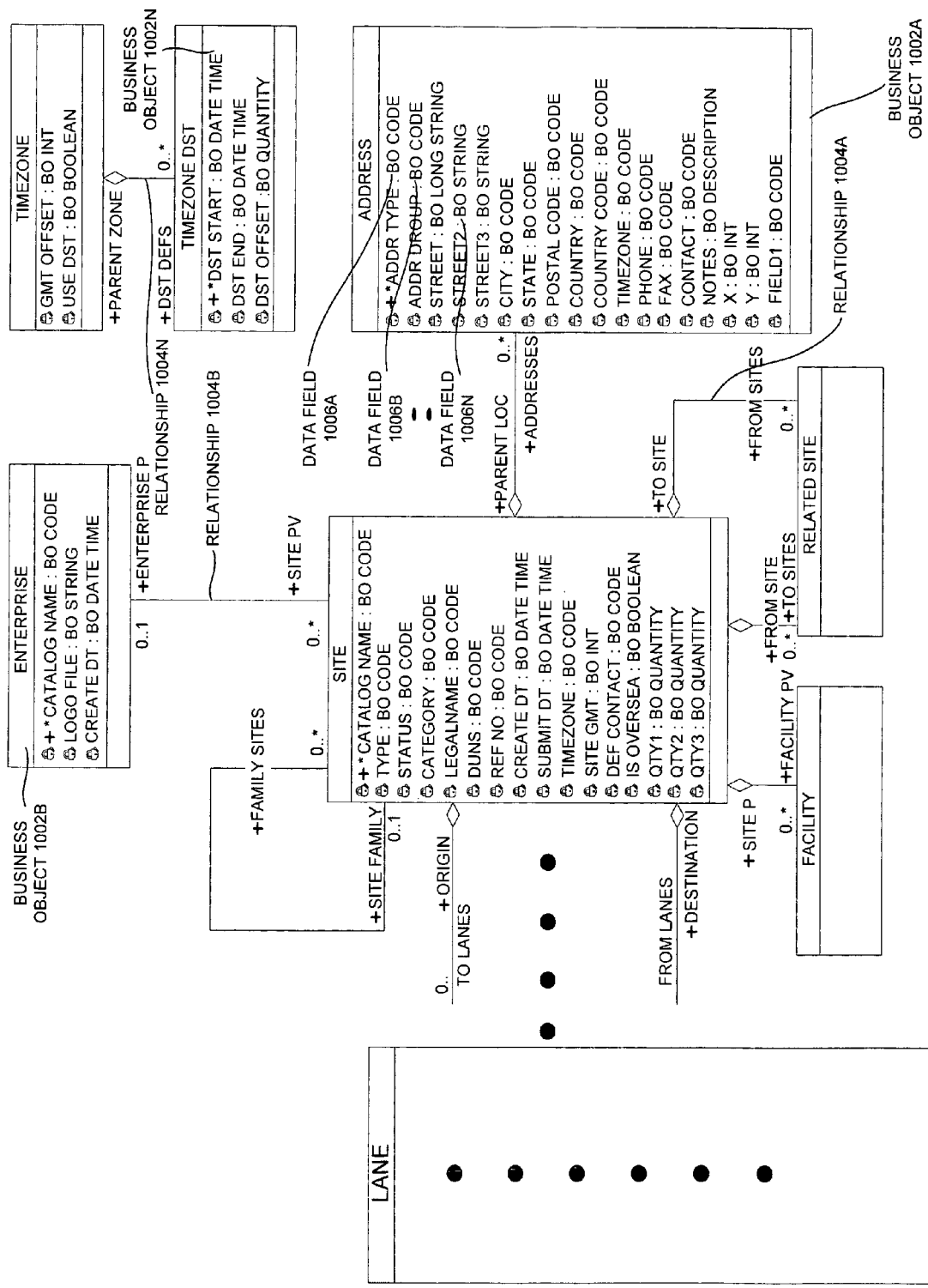
FIGURE 10  BUSINESS OBJECT VIEW 1000

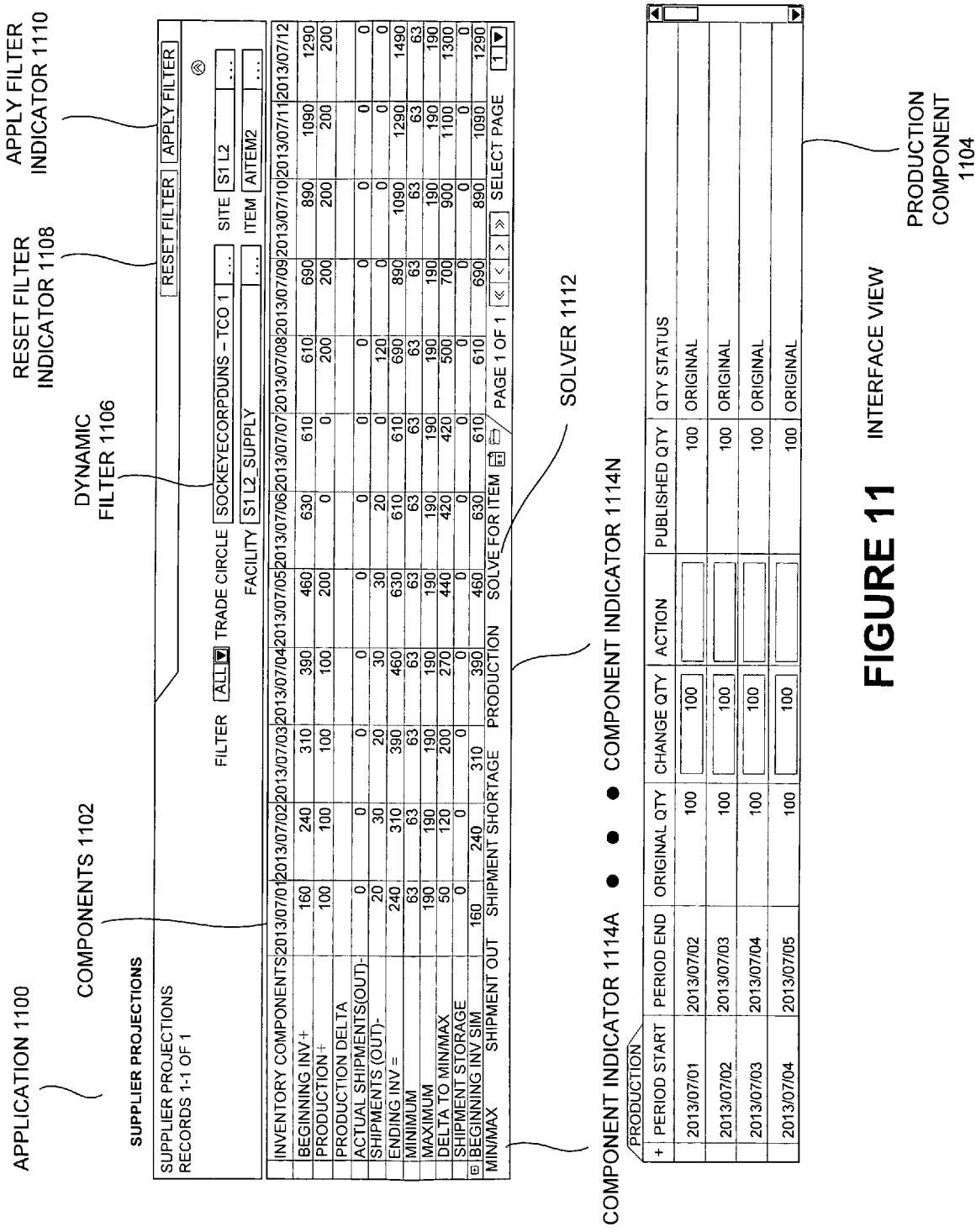
FIGURE 11 INTERFACE VIEW

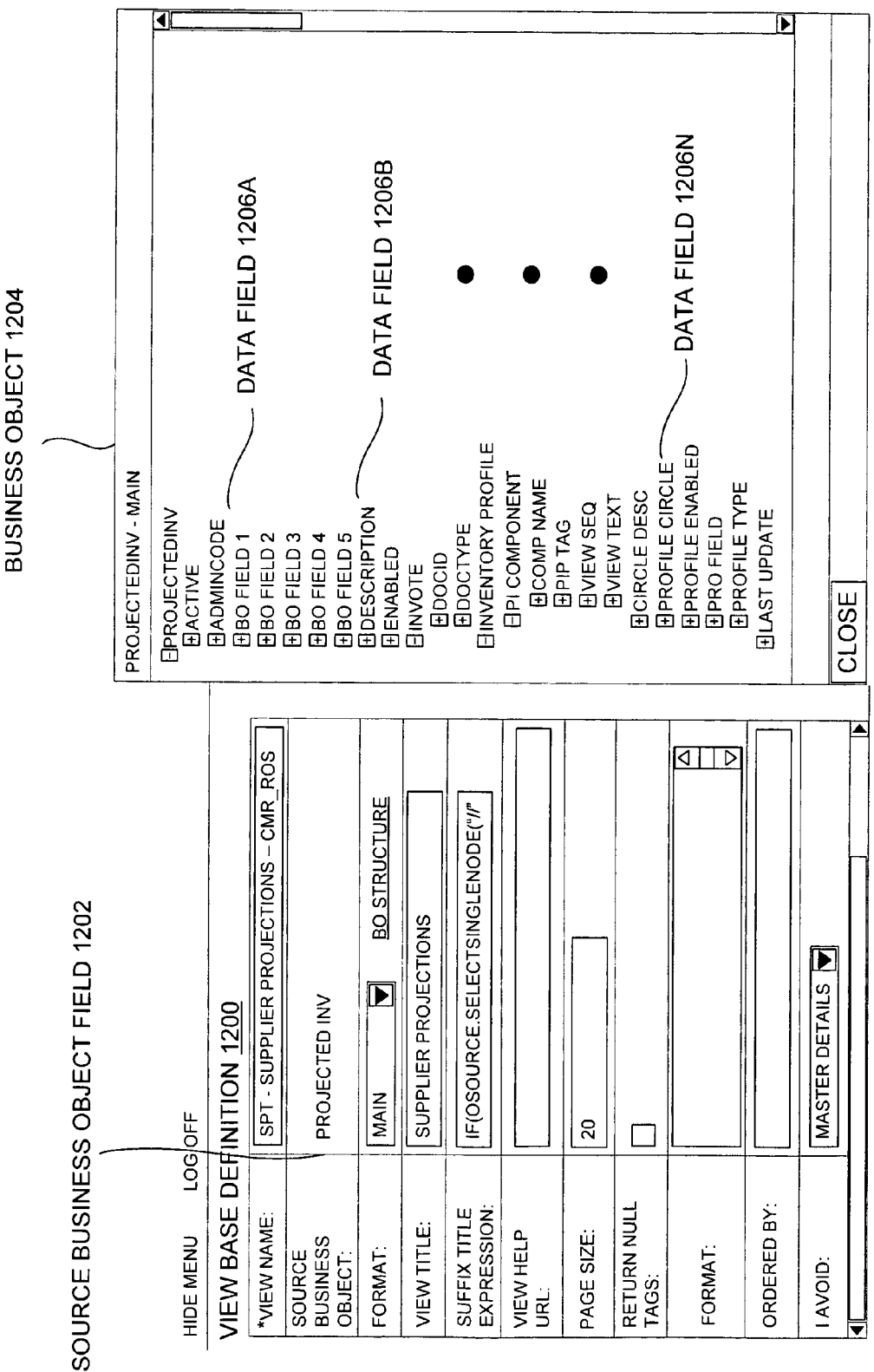
FIGURE 12    INTERFACE VIEW

DYNAMIC FILTER DEFINITION

| *FILTER FIELD: | | | | FILTER FIELD 1304 |
| --- | --- | --- | --- | --- |
| MULTI-ACCESS: | ▶ | | MULTI-SEQUENCE: ▶ | |
| RELATED TO: | | | | |
| PICK LIST: | | | | |
| REQUIRED: ○ | DEFAULT VALUE: ○ | | | |

BUSINESS OBJECT RELATION FIELD 1306

FILTER OPERATIONS

| + * → | VALUE | SEQ. | DEFAULT | DISPLAY TEXT | OFF |
| --- | --- | --- | --- | --- | --- |
| | THERE ARE NO OPERATORS DEFINED | | | | |

FILTER OPERATIONS CONFIGURATION 1302

DYNAMIC FILTER VALUE FIELD 1308

[ OK ] [ CANCEL ]

NOTE: * = REQUIRED

FIGURE 13     INTERFACE VIEW

ALERT TYPE DEFINITION 1400

| CODE: | BMR_PO APPROVAL REQUIRED | DESCRIPTION: | |
|---|---|---|---|
| PRIORITY: | 2 ▶ | RAISED ON BO CLASS: | PO3LINE  BOSTRUCTURE |
| FIRST ESCALATE IN (SEC): | 0 | NEXT ESCALATE IN (SEC): | 0 |
| EXPIRES IN (SEC): | 0 | ENABLED: | ☑ |
| TRIGGER MODE: | SCHEDULE ▶ | POLL INTERVAL: | 60 |
| DEFINED BY BO CLASS: | ALERT_BMR_PO APPROVAL REQUIRED | GROUP: | INVENTORY |
| TRIGGER EVENT BO TAG: | ▶ | TRIGGER EVENT TAG VALUE: | |
| EMAIL MODE: | EVENT ▶ | DEPLOYMENT STATUS: | DEPLOYED |

TRIGGER MODE FIELD 1404

RELATED BUSINESS OBJECT FIELD 1410

TRIGGER BUSINESS OBJECT FIELD 1406

ALERT BUSINESS OBJECT FIELD 1402

TRIGGER EVENT FIELD 1408

ALERT MAPPING/MESSAGE

| 📄 ALERT MAPPING | 📄 ALERT MESSAGE |
|---|---|
| ALERT MAPPING | ALERT MESSAGE |

ALERT MAPPING FIELD 1412

ALERT MESSAGE FIELD 1414

[SUBMIT] [DEPLOY] [SAVE TO FILE] [BACK TO ALERT TYPE PAGE]

FIGURE 14   INTERFACE VIEW

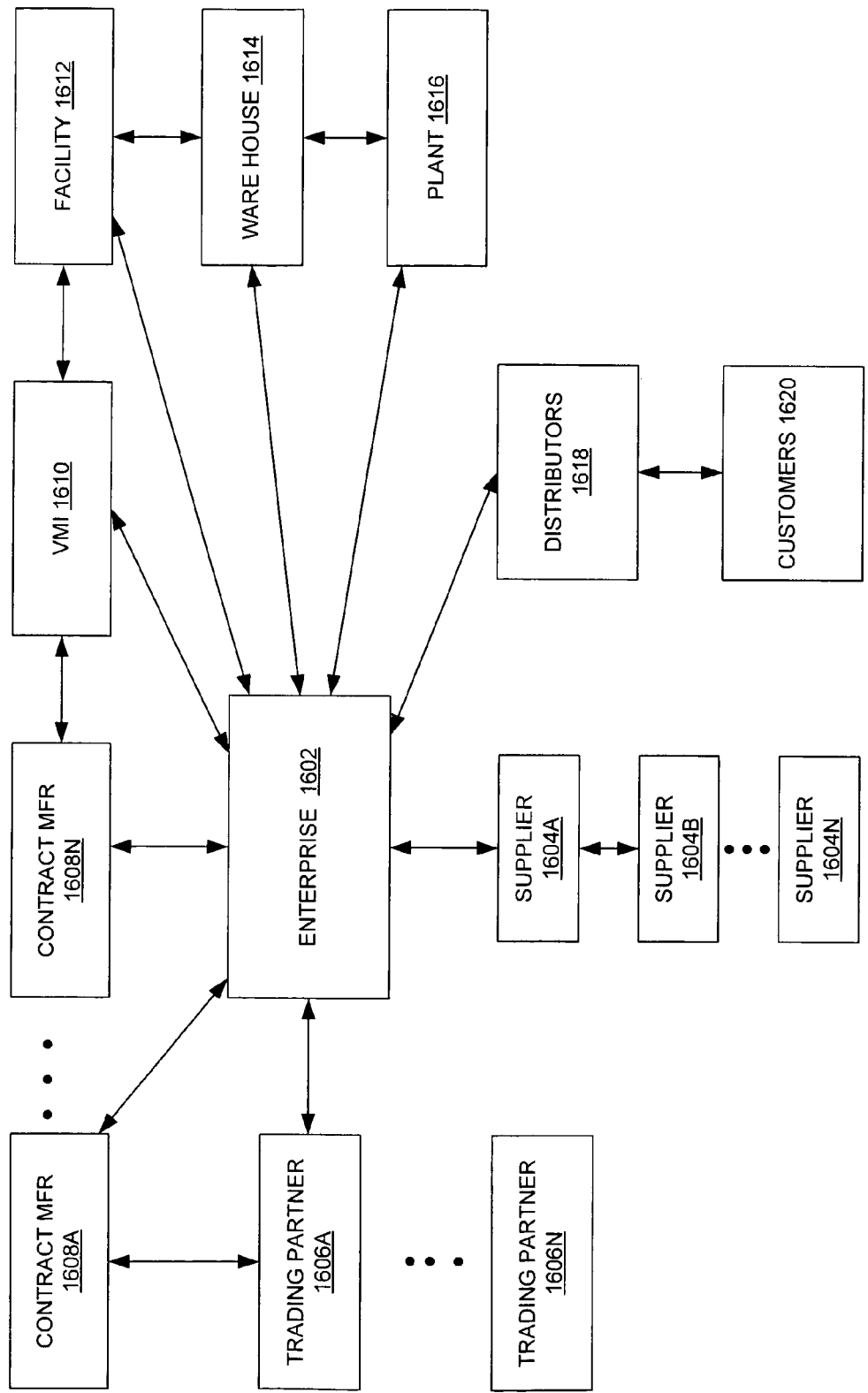
FIGURE 16   TRADING ENVIRONMENT 1600   ENVIRONMENT VIEW

COMMON SEMANTIC MODEL OF MANAGEMENT OF A SUPPLY CHAIN

FIELD OF TECHNOLOGY

This disclosure relates generally to the technical fields of common semantic modeling, and in one example embodiment, common semantic model of management of a supply chain.

BACKGROUND

An entity (e.g., a corporation, a limited liability company, a partnership, etc.) may provide goods and/or services to a large number of customers (e.g., end-users, other entities, manufacturers, the public, etc.). The entity, therefore, may need to maintain a large enough inventory (e.g., manufacture, process, store, produce, engineer, treat, package, test, quality control, etc.) in order to provide the goods and/or services for the large number of customers. Additionally, the entity may need to maintain a large enough workforce (e.g., laborers, mechanics, metal workers, factory workers, drivers, associates, managers, customer service representatives, sales representatives, officers, directors, engineers, scientists, doctors, financial experts, lawyers, accountants, tax preparers, marketing representatives, bankers, etc.) to create the goods and/or services, to research and develop new goods and/or services, and/or to provide ancillary services related to the goods and/or services (e.g., manufacture, process, store, produce, engineer, treat, package, test, quality control, etc.) for the large number of customers.

Therefore, in order to provide a large number of customers with a variety of new and current goods and/or services and/or ancillary services, the entity may need to build, maintain, and network an infrastructure (e.g., a supply chain) of a number of internal sites (e.g., warehouses, manufacturing plant, processing plant, headquarters, shipping ports, service centers, distribution centers, offices, refinery, research and development laboratories, etc.) and a number of external sites (e.g., contract manufacturers, VMI (vendor managed inventory) sites, service provides, content providers, vendors, suppliers, trading partners, consumers, etc.) in order to maintain a large enough inventory and direct a large enough workforce.

Management of the supply chain of the entity (e.g., management of planning, production, materials, purchasing, inventory, sales, logistics, marketing, finance, human resources related to the provision of goods and/or services to customers) may prove to be a difficult, time-consuming, and expensive task. The entity may use certain information systems (e.g., SCM (Supply Chain Management)) to optimize the achievement of objectives of the entity. The supply chain may have to adapt to constantly changing marketplaces for the supply of materials and the demand for goods and/or services. The supply chain may have to maintain, process, and analyze large amounts of data related to different aspects of the management of the supply chain. The Supply Chain Management information system and database may be updated, processed, and manipulated by information systems (e.g., MRP (Material Requirements Planning), ERP (Enterprise Resource Planning), etc.) of the entity and/or other related entities in the supply chain.

The Supply Chain Management information system may find it difficult to integrate and maintain databases and other systems associated with internal and external sites of the supply chain. Subsystems and machines of external and internal sites may have various descriptions of a supply chain data. The Supply Chain Management may only permit configuration and customization of the user interface and applications through the use of a technical programming language.

Poor supply chain management may result in disruptions and problems in the external and internal sites of the supply chain and provide inaccurate information and analysis of the internal and external sites of the supply chain. The supply chain management may be difficult for various users (e.g., employees, consultants, customers, etc.) of the entity to use, especially users with little or no technical experience. The complexities associated with supply chain management may to divert attention of users from more important matters germane to the entity. Poor supply chain management may increase the cost associated with the flow of materials in a supply chain.

SUMMARY

A method and apparatus of common semantic model for management of a supply chain are disclosed. In one aspect, a method includes providing a data field library, creating a supply chain node, associating a particular item of the data field library as a component of the supply chain node and automatically defining a relationship between the supply chain node and other supply chain nodes in a multi-level supply chain through linkages of the particular item with other items in the other supply chain nodes as referenced through paired ones of the particular item in different supply chain nodes.

Furthermore, the method may include defining a relationship between the supply chain node and other supply chain nodes in the multi-level supply chain. The method may include enabling a user to drag and drop items of the data field library to the supply chain node. The method may also include aggregating various items of the data field library into a grouped set of items, and automatically applying the grouped set of items to the supply chain node.

In addition, the method may include applying a data structure view to certain ones of the supply chain node and the other supply chain nodes to provide a condensed data structure to a particular entity in the multi-level supply chain. Moreover, the method may include organizing the condensed data structure into a customizable set of key performance indicators associated with the particular entity.

In another aspect, a method includes associating a supply chain data of a relational database with condensed data structure, defining a schema of the condensed data structure to describe the supply chain data, providing a language having an adaptive, modular function oriented syntax specified by expression of the schema (e.g., the language may be a XML-based language having the adaptive, modular function syntax specified by expression of the schema in the XML schema language), providing a mapping between the language and a database language (e.g., the database language may be SQL such that a mapping between the XML-based language and the SQL to enable automatic generation of a set of executable SQL instructions from a function expressed in the XML-based language) to enable interaction with the supply chain data and automatically generating a sequence of executable instructions in the database language from a function expressed in the language to apply the function on the supply chain data.

The method may further include instantiating a dynamic filter of the supply chain data by defining a sequence of instructions expressed in the language to further focus on specific identified criteria to create a collapsible summary table. The method may include configuring a customized view of the supply chain data by defining the sequence of instructions expressed in the language to display a particular arrangement of the supply chain data to create a collapsible view table. Moreover, the method of may include configuring a customized alert to provide a notification of an event of the supply chain data and to enable management of the event, wherein the customized alert is defined in a condensed data structure of the at least one condensed data structure.

Also, the method may include defining a set of validation rules in the at least one condensed data structure to compare with and to verify various values in the supply chain data to enable management of a potential disruption in a flow of materials in the supply chain. Similarly, the method may include defining a set of replenishment rules in the at least one condensed data structure to compare with and to adjust various values in the supply chain data to plan an inventory. The method may include defining a set of policies in the at least one condensed data structure to compare with various values in the supply chain data to optimize the flow of materials in a supply chain.

The method may also include automatically identifying an inconsistency in the supply chain data to enable management of the potential disruption in the flow of materials in the supply chain. Similarly, the method may include automatically identifying at least one violation of the validation rules, violation of the replenishment rules, and violation of the policies of the supply chain data to enable management of the potential disruption in the flow of materials in the supply chain. Furthermore, the method may include automatically identifying a conflict in the supply chain data when a particular item exceeds a customizable threshold parameter to enable management of the potential disruption in the flow of materials in the supply chain.

The method may include referencing a stored procedure to resolve at least one violation of the replenishment rules, conflict, inconsistency, violation of the validation rules, and violation of the policies. Also, the method may include automatically resolving at least one inconsistency, conflict, violation of the replenishment rules, violation of the validation rules, and violation of the policies through execution of a series of instructions expressed in the language to manipulate the supply chain data to produce at least one acceptable replacement value.

In yet another aspect, a supply module includes a business object module to define schema to describe a group of data objects associated with a supply chain data, a XML-based language generator module to process the at least one schema and a SQL generator module to provide a sequence of SQL instructions to perform a query expressed in the XML-based language. The supply module may further include a schema language module to express the at least one schema to enable the XML-based language generator module to specify a XML-based language.

The supply module may also include an environment module of the business object module to create a number of dynamic models of the various environments of a supply chain. In addition, the supply module may include a constraint module of the business object module to define a number of validation rules, a number of replenishment rules, a number of key performance indicators, and a number of policies such that the supply chain data to conform to the number of validation rules, the number of replenishment rules, the number of key performance indicators, and the number of policies.

Moreover, the supply module may include a view module to enable the development of customizable views, the view module to process a sequence of instructions expressed in the XML-based language to a sequence of SQL instructions to display a particular arrangement of the supply chain data. The supply module may include an alert module to enable development of customizable alerts, the alert module to process a sequence of instructions expressed in the XML-based language into a sequence of SQL instructions to provide a notification of an event in the supply chain.

Also, the supply module may include a dynamic filter module to enable development of dynamic filters, the dynamic filter module to process a sequence of instructions expressed in the XML-based language into a sequence of SQL instructions to further focus on specific identified criteria. The supply module may include an application module of the management module to enable development of customizable applications, the application module to select a template from a template library, to select from a component library (e.g., the component of the component library to incorporate a set of instructions expressed in the XML-based language to perform a set of definable functions on the supply chain data) to embed the template. Furthermore, the supply module may include a solver module of the management module to provide a solution to a potential disruption in the supply chain through manipulation of the supply chain data.

The supply module may also include a component library of the management module including a number of service modules, a number of process modules, and a number of agent modules, each component to perform a set of functions on the supply chain data. A supply module may include a role module to define a set of roles of various users of the supply module such the various users have a limited set of capabilities based on their role in the supply chain. A role module of the management module may enable assignment of more than one role to a user such that the user has a different set of capabilities associated with each role. Similarly, the role module of the management module to limit access to the supply chain data based on a specific role.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 6 is an interaction diagram view of process flow between a supply chain data, a supply chain and an entity, according to one embodiment.

FIG. 7 is an exploded view of constraint module of FIG. 2, according to one embodiment.

FIG. 8 is a table view of a purchase and delivery details, according to one embodiment.

FIG. 9 is a virtual business object view of virtual relationships between virtual business objects, according to one embodiment.

FIG. 10 is a business object view of relationships between business objects, according to one embodiment.

FIG. 11 is an interface view of an application, according to one embodiment.

FIG. 12 is an interface view of a view base definition, according to one embodiment.

FIG. 13 is an interface view of a dynamic filter definition, according to one embodiment.

FIG. 14 is an interface view of an alert type definition, according to one embodiment.

FIG. 16 is an environment view of a trading environment, according to one embodiment.

Figure 1:
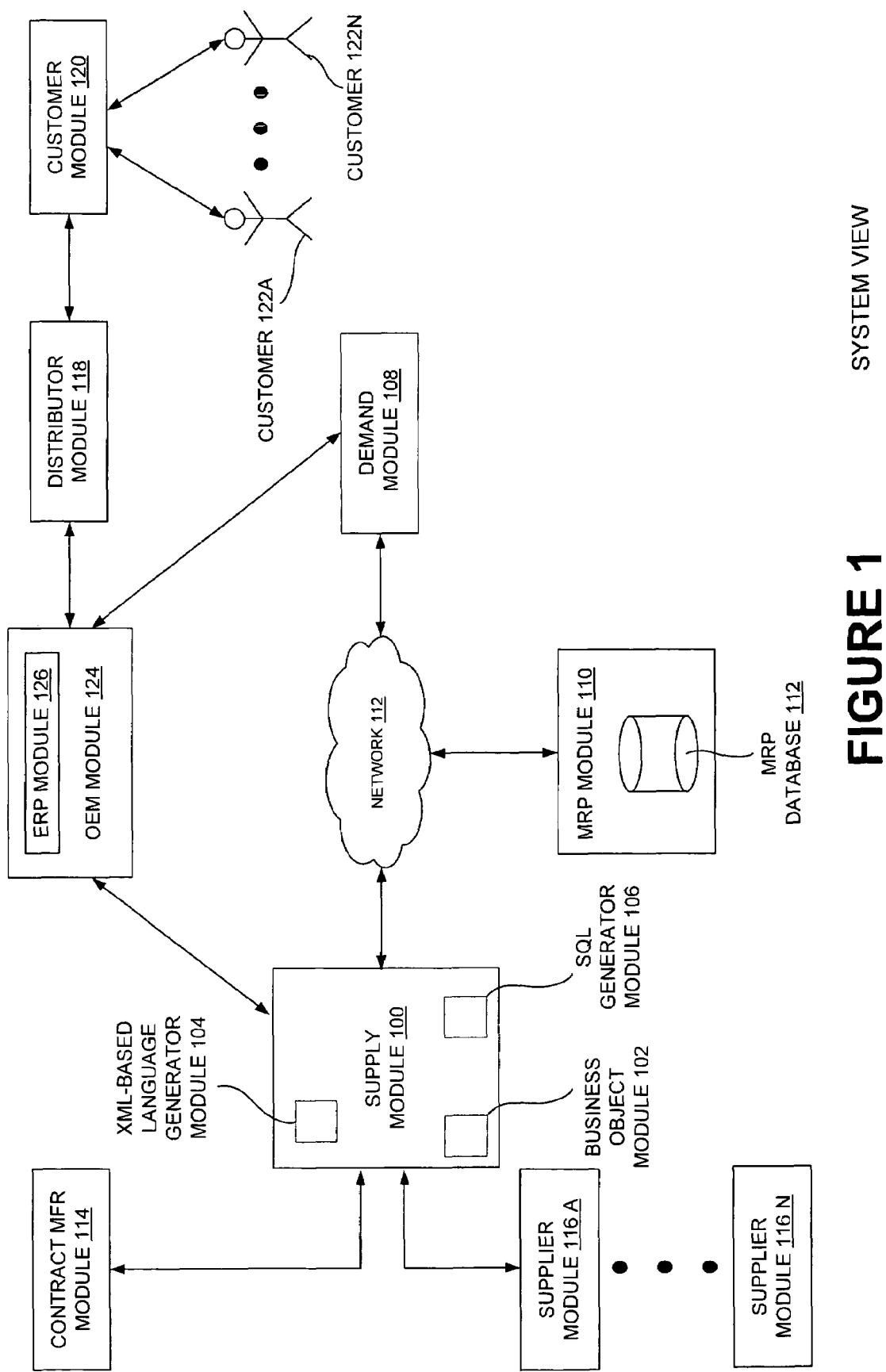
FIG. 1 is a system view of a supply module communicating with a demand module and a MRP module through a network, according to one embodiment.

Other features of the present embodiments will be apparent from the accompanying drawings and from the detailed description that follows.

DETAILED DESCRIPTION

Common semantic model for management of a supply chain is disclosed. In the following description, for the purposes of explanation, numerous specific details are set forth in order to provide a thorough understanding of the various embodiments. It will be evident, however to one skilled in the art that various embodiments may be practiced without these specific details.

In one embodiment, a method includes providing a data field library, creating a supply chain node (e.g., a node 306 of FIG. 3), associating a particular item of the data field library (e.g., a data field library 300 of FIG. 3) as a component of the supply chain node (e.g., the node 306 of FIG. 3) and automatically defining a relationship between the supply chain node (e.g., the node 306 of FIG. 3) and other supply chain nodes in a multi-level supply chain through linkages of the particular item with other items in the other supply chain nodes as referenced through paired ones of the particular item in different supply chain nodes.

In another embodiment, a method includes associating a supply chain data of a relational database with condensed data structure (e.g., a data structure module 308 of FIG. 3), defining schema of the condensed data structure (e.g., the data structure module 308 of FIG. 3) to describe the supply chain data, providing a language having an adaptive, modular function oriented syntax specified by expression of the schema, providing a mapping between the language and a database language to enable interaction with the supply chain data and automatically generating a sequence of executable instructions in the database language from a function expressed in the language to apply the function on the supply chain data.

In yet another embodiment, a supply module (e.g., a supply module 100 of FIG. 1) includes a business object module (e.g., a business object module 200 of FIG. 2) to define at least one schema to describe a group of data objects (e.g., data objects 402 of FIG. 4) associated with a supply chain data, a XML-based language generator module (e.g., a XML-based language generator module 210 of FIG. 2) to process the at least one schema, and a SQL generator module (e.g., a SQL generator module 222 of FIG. 2) to provide a sequence of SQL instructions to perform a query expressed in the XML-based language.

FIG. 1 is a system view of a supply module 100 communicating with a demand module 102 and MRP module 104 through a network 112, according to one embodiment. Particularly, the FIG. 1 illustrates the supply module 100, the demand module 102, the MRP module 104, a MRP database 106, an OEM module 108, an ERP module 110, a network 112, a contract mfr module 114, the supplier modules 116, a distributor module 118, a customer module 120 and the customers 122, according to one embodiment.

The supply module 100 may monitor (e.g., scrutinize, supervise, examine) a flow of materials through supply chain and/or may implement a common semantic model to integrate and/or develop a number of components across the supply chain. The demand module 102 may distribute (e.g., through distributor module 118 of FIG. 1) the flow of materials to various customers (e.g., the customers 122 of FIG. 1), may manage an inventory, may process information provided by the supply module (e.g., the supply module 100 of FIG. 1), and/or may provide information related to inventory replenishment and customer demand.

The MRP module 104 may provide recent inventory and planning information of the supply chain (e.g., stored in the MRP database 106 of FIG. 1) to the supply module 100 and the demand module 102 through a network 112. A MRP database 106 may be a directory (e.g., a file, a folder, a catalogue, a list, etc) that may withhold the recent inventory and planning information of the supply chain.

The OEM module 108 (Original Equipment Manufacturer) may be a company (e.g., a corporation, a firm, an industry, an organization, etc.) that builds products or components which are used in products sold by another company.

The ERP module 110 (Enterprise Resource Planning) may be a software and/or a hardware that may integrate all data and processes of an organization into a single unified system. The ERP module 110 may run on a single database instance with multiple software modules, providing the various business functions of an organization. A Network 112 may consists of exchanging information (e.g., on the telephone, in hallways, in company lunchrooms, at professional conferences, at trade shows, company meetings, classrooms, lounges, hallways, elevators, airplanes, trains, busses, hotel lobbies and waiting rooms) and/or establishing personal connections with the supply module 100, the demand module 102, and the MRP module 104 for fulfilling customer demands through the most efficient use of resources (e.g., distribution capacity, inventory, labor etc.).

The contract MFR module 114 may be a firm (e.g., an organization, a company, an industry,) that manufactures components or products for another "hiring" firm. The contract MFR module 114 may be used as an alternative for operating and maintaining their own firms (e.g., an organization, a company, an industry, etc). The supplier modules 116 may move (e.g., supply, furnish, distribute, trade in, deliver etc.) a product and/or service in physical and/or virtual manner to customer (e.g., customer 122 of FIG. 1). The distributor module 118 may be a middleman between the manufacturer and retailer. The customer module 120 may provide services to the customer 122 (e.g., an internal customer and/or an external customer). The customers 122 may be an external customer and/or internal customer who receives and/or makes use of the products and/or services provided by an individual and/or organization (e.g., the customer module 120 of FIG. 1). For example, as illustrated in FIG. 1, the supply module 100 communicates with a supplier module 116 A, and a supplier module 116 N. In addition, the supply module 100 as illustrated in the embodiment of FIG. 1 may communicate with the demand module 102 and MRP module 104 through a network 112. The supply module 100 directly communicates with the OEM module 108 and contract mfr module 114 as illustrated in example embodiments of FIG. 1. The demand module 102 as illustrated in embodiments of FIG. 1 directly communicates with the OEM module 108. The demand module 102 may communicate with the supply module 100 and MRP module 104 through the network 112 according to the embodiments illustrated in FIG. 1. The MRP module 104 as illustrated in the embodiment of FIG. 1 may communicate with the supply module 100 and demand module 102 through a network 112. In example embodiment as illustrated in FIG. 1, the OEM module 108 directly communicates with the supply module 100, demand module 102, and distributor module 118. In addition, a distributor module 118 directly communicates with the OEM module 108 and customer module 120 according to example embodiment as illustrated in FIG. 1. The customer module 120 as illustrated in FIG. 1 directly communicates with the customers 122.

For example, a system includes a number of supplier modules (e.g., the supplier modules 116 of FIG. 1) arranged in tiers based on a position of each of the number of suppliers in a supply chain. A supply module 100 may monitor and direct a flow of materials through the supply chain, the supply module 100 may implement a common semantic model to develop various custom components and to integrate a number of components across the supply chain, and each component may perform an operation of the supply chain data and to produce an output data.

A demand module (e.g., the demand module 102 of FIG. 1) may distribute the flow of materials to various customers, may manage an inventory, may process information provided by the supply module (e.g., the supply module 100 of FIG. 1), and/or may provide information related to inventory replenishment and customer demand. In addition, the system may include a MRP module (e.g., the MRP module 104 of FIG. 1) to provide recent inventory and planning information of the operations chain to the supply module (e.g., the supply module 100 of FIG. 1) and the demand module (e.g., the demand module 102 of FIG. 1).

Figure 2:
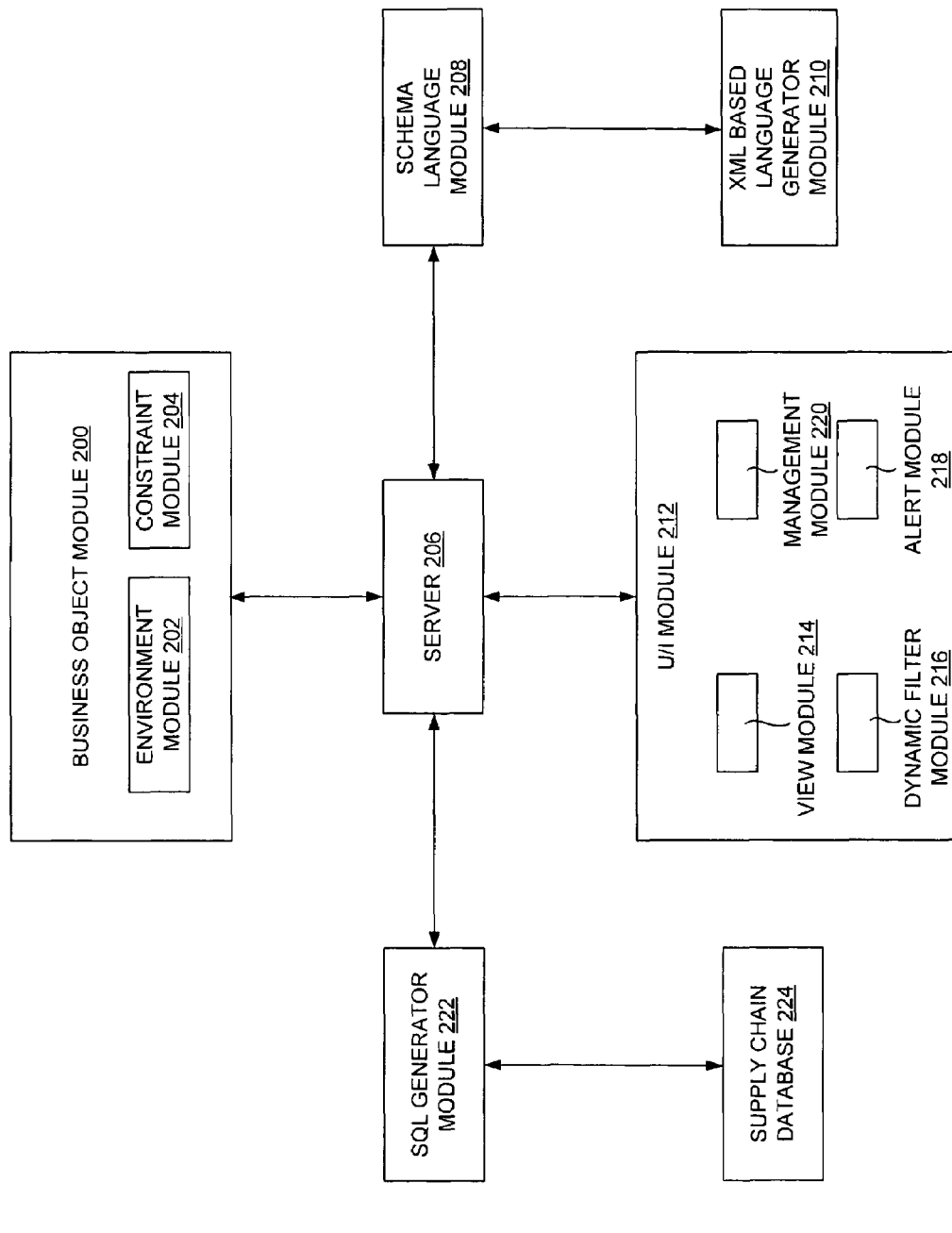
FIG. 2 is an exploded view of a supply module of FIG. 1, according to one embodiment.

FIG. 2 is an exploded view of the supply module 100 of FIG. 1, according to one embodiment. Particularly, the FIG. 2 illustrates a business object module 200, an environment module 202, a constraint module 204, a server 206, a schema language module 208, a XML-based language generator module 210, an U/I module 212, a view module 214, a dynamic filter module 216, an alert module 218, a management module 220, a SQL generator module 222, and a supply chain database 224, according to one embodiment.

A business object module 200 may define the schema to describe a group of data objects associated with a supply chain data. The environment module 202 may create a number of dynamic models of the various environments of a supply chain. The constraint module 204 may define a number of validation rules, a number of replenishment rules, a number of key performance indicators, and a number of policies such that the supply chain data to conform to the number of validation rules, the number of replenishment rules, the number of key performance indicators, and the number of policies.

A server 206 may be hardware and/or software that may provide database services (e.g., add, access, process data) and/or may be dedicated to running certain software applications that may used in the supply chain of the supply module 100 of FIG. 1.

The schema language module 208 may contain structural description of the type of facts held in that database (e.g., the supply chain database 224 of FIG. 2). The schema language module 208 may express the schema to enable the XML-based language generator (e.g., the XML-based language generator module 210 of FIG. 2) module to specify the XML-based language (e.g., a XML-based query language, Xquery, SQL/XML). The XML-based language generator module 210 may process the schema to specify the XML-based language.

The U/I module 212 may enable the development of customizable views, development of dynamic filters, development of customizable alerts, and/or development of customizable applications. The view module 214 may process (e.g., translate) a sequence of instructions expressed in the XML-based language to a sequence of SQL instructions to display a particular arrangement of the supply chain data. The dynamic filter module 216 may process a sequence of instructions expressed in the XML-based language into a sequence of SQL instructions to further focus on specific identified criteria. The alert module 218 may process a sequence of instructions expressed in the XML-based language into a sequence of SQL instructions to provide a notification of an event in the supply chain.

The management module 220 may process (e.g., translate) a sequence of instructions expressed in the XML-based language (e.g., XML programming using the XML schema as a syntax) into a sequence of SQL instructions to manage an event in the supply chain (e.g., SQL instructions may use XML extensions, XML data may be translated into database tables). The SQL generator module 222 (e.g., SQL server) may provide a sequence of SQL instructions to perform a query expressed in the XML-based language (e.g., SQL instructions translated from the query). The supply chain database 224 may be a collection of logically related data that may be designed to coordinate system of organizations, people, activities, information and resources involved in moving a product and/or service in physical and/or virtual manner from supplier (e.g., the supplier modules 116 of FIG. 1) to customer (e.g., the customers 122 of FIG. 1).

For example, as illustrated in FIG. 1, the business object module 200 may communicate with the schema language module 208, U/I module 212 and SQL generator module 222 through the server 206. The schema language module 208 directly communicates with the XML-based language generator module 210 according to the embodiments as illustrated FIG. 2. In addition, illustrated in FIG. 2 the XML-based language generator module 210 directly communicates with the schema language module 208. The SQL generator module 222 as illustrated in embodiments of FIG. 1 directly communicates with the supply chain database (e.g., the supply chain database 224 of FIG. 2).

The supply module (e.g., the supply module 100 of FIG. 1) may include a business object module (e.g., the business object module 200 of FIG. 2) to define schema to describe a group of data objects associated with a supply chain data, a XML-based language generator module (e.g., the XML-based language generator module 210 of FIG. 2) may process the schema, a SQL generator module (e.g., the SQL generator module 222 of FIG. 2) may provide a sequence of SQL instructions to perform a query expressed in the XML-based language, a schema language module (e.g., the schema language module 208 of FIG. 2) to express the schema to enable the XML-based language generator module (e.g., the XML-based language generator module 210 of FIG. 2) to specify the XML-based language.

The supply module (e.g., the supply module 100 of FIG. 1) may include an environment module of the business object module (e.g., the business object module 200 of FIG. 2) to create a number of dynamic models of the various environments of a supply chain. Furthermore, the supply module (e.g., the supply module 100 of FIG. 1) may include a constraint module of the business object module (e.g., the business object module 200 of FIG. 2) to define a number of validation rules, a number of replenishment rules, a number of key performance indicators, and a number of policies such that the supply chain data may conform to the number of validation rules, the number of replenishment rules, the number of key performance indicators, and the number of policies.

The supply module (e.g., the supply module 100 of FIG. 1) may include a view module to enable the development of customizable views, the view module (e.g., the view module 214 of FIG. 2) to process a sequence of instructions expressed in the XML-based language to a sequence of SQL instructions to display a particular arrangement of the supply chain data. In addition, the supply module (e.g., the supply module 100 of FIG. 1) may include an alert module (e.g., the alert module 218 of FIG. 2) to enable development of customizable alerts, the alert module (e.g., the alert module 218 of FIG. 2) to process a sequence of instructions expressed in the XML-based language into a sequence of SQL instructions to provide a notification of an event in the supply chain.

The supply module (e.g., the supply module 100 of FIG. 1) may also include a dynamic filter module to enable development of dynamic filters, the dynamic filter module to process a sequence of instructions expressed in the XML-based language into a sequence of SQL instructions to further focus on specific identified criteria.

Figure 3:
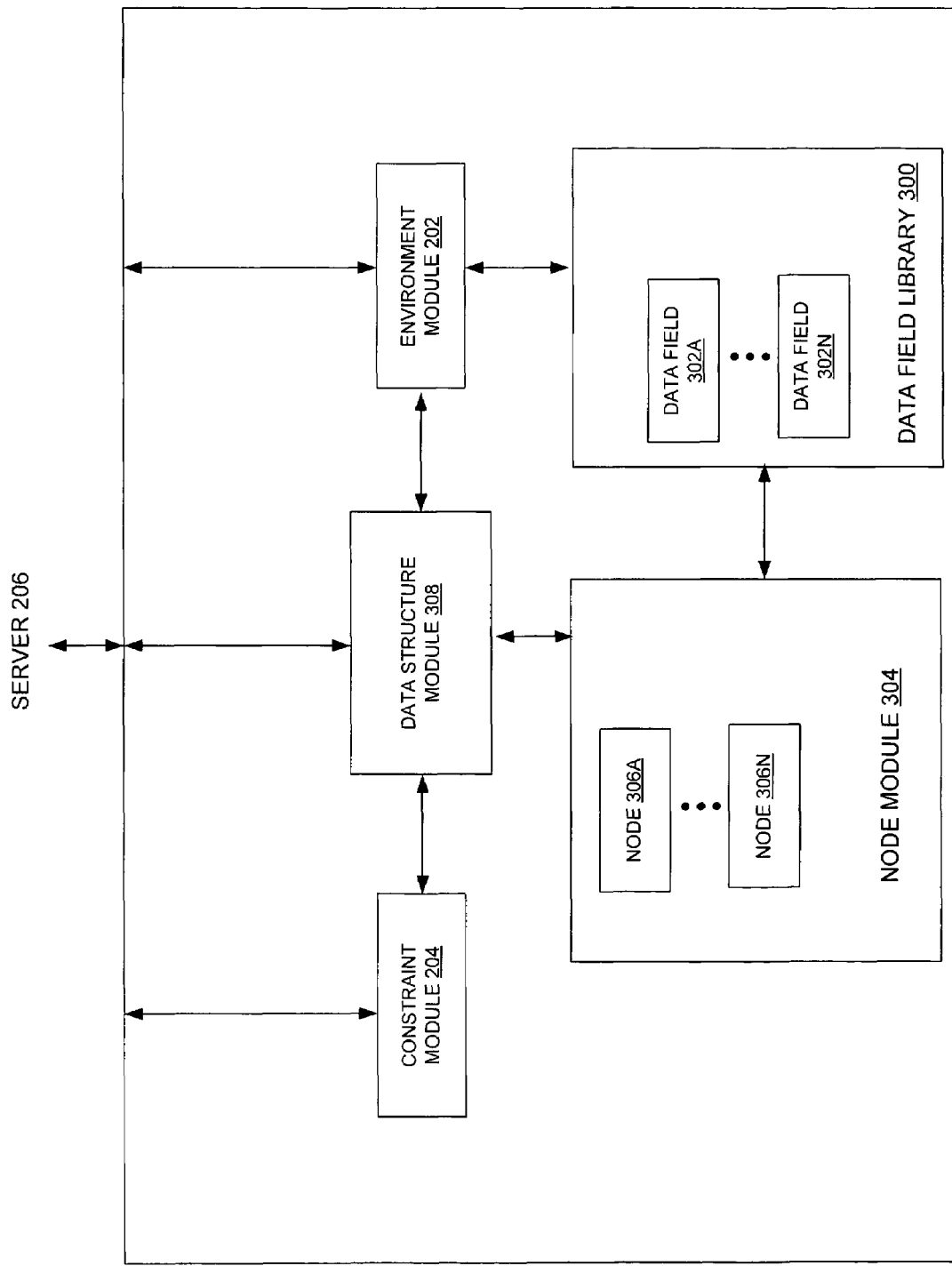
FIG. 3 is an exploded view of a business object module of FIG. 2, according to one embodiment.

FIG. 3 is an exploded view of a business object module 200, according to one embodiment. Particularly, FIG. 3 illustrates a data field library 300, data fields 302, a node module 304, the nodes 306, an environment module 202, a constraint module 204, and a data structure module 308, according to one embodiment.

The data field library (e.g., the data field library 300 of FIG. 3) may enable a user to drag and drop items of the data field library (e.g., the data field library 300 of FIG. 3) to the supply chain node. The data fields 302 may with hold the data related to the supply chain database that may be used by user in transferring the grouped items to the supply chain node. The node module 304 may provide a condensed data structure to a particular entity in the multi-level supply chain. The nodes 306 may process the various items of the grouped set of items to provide condensed data structure to a particular entity in the multilevel supply chain. The environment module 202 may create a number of dynamic models of the various environments of a supply chain. The constraint module 204 may define a number of validation rules, a number of replenishment rules, a number of key performance indicators, and a number of policies such that the supply chain data may conform to the number of validation rules, the number of replenishment rules, the number of key performance indicators, and the number of policies. The data structure module 308 may be a way of storing data in a database so that supply chain data may be used efficiently. The data structure module 308 may allow a variety of critical operations to be performed, using as few resources, both execution time and memory space.

In the example embodiments illustrated in FIG. 3, the data field library 300 communicates with the node module 304 and the environment module 202. The node module 304 also communicates with the data structure module 308. In example embodiments illustrated in FIG. 3, the environment module 202 communicates with the data field library 300 and data structure module 308. The data structure module 308 as illustrated in example embodiments of FIG. 3 interacts with the node module 304, environment module 202 and constraint module 204.

For example, a method includes providing a data field library (e.g., the data field library 300 of FIG. 3). A supply chain node may also be created. A particular item of the data field library (e.g., the data field library 300 of FIG. 3) may be associated as a component of the supply chain node (e.g., the node 306 of FIG. 3). Also, a relationship between the supply chain node (e.g., the node 306 of FIG. 3) and other supply chain nodes in a multi-level supply chain may be automatically defined through linkages of the particular item with other items in the other supply chain nodes as referenced through paired ones of the particular item in different supply chain nodes.

In addition, the method may include defining a relationship between the supply chain node (e.g., the node 306 of FIG. 3) and other supply chain nodes in the multi-level supply chain. The method may include enabling a user to drag and drop items of the data field library (e.g., the data field library 300 of FIG. 3) to the supply chain node (e.g., the node 306 of FIG. 3). The method may further include aggregating various items of the data field library (e.g., the data field library 300 of FIG. 3) into a grouped set of items, and automatically applying the grouped set of items to the supply chain node (e.g., the node 306 of FIG. 3). The method may also include applying a data structure view to certain ones of the supply chain node and the other supply chain nodes to provide a condensed data structure (e.g., the data structure module 308 of FIG. 3) to a particular entity in the multi-level supply chain. Moreover, the method may include organizing the condensed data structure into a customizable set of key performance indicators associated with the particular entity.

Figure 4:
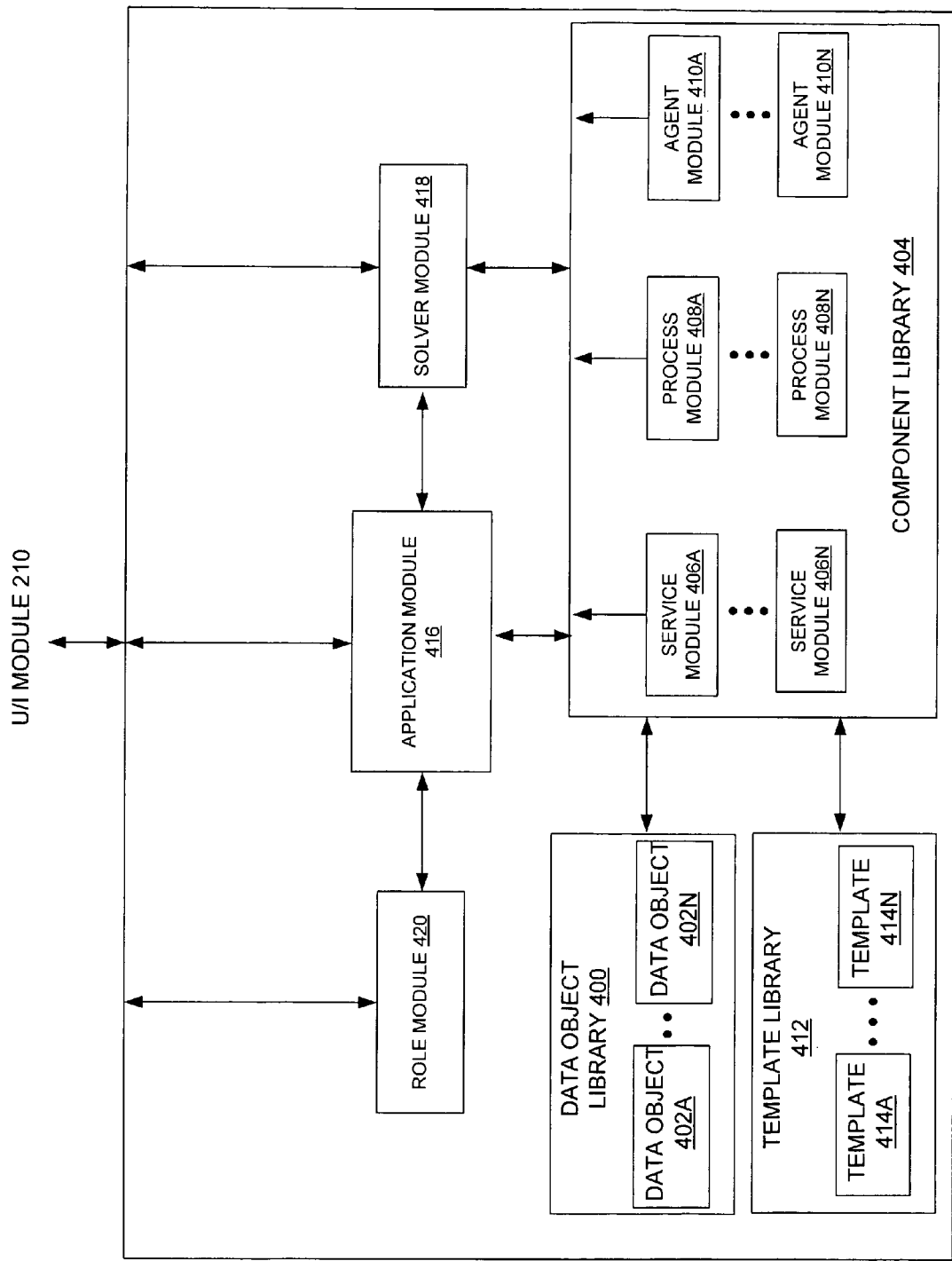
FIG. 4 is an exploded view of a management module of FIG. 2, according to one embodiment.

FIG. 4 is an exploded view of a management module 220, according to one embodiment. Particularly, FIG. 4 illustrates a data object library 400, data objects 402, a component library 404, service modules 406, process modules 408 and agent modules 410, a template library 412, templates 414, an application modules 416, a solver module 418, and a role module 420, according to one embodiment.

The data object library 400 may consist of a group of data objects as collections of various data fields of an operations chain data. The data objects 402 may be a collection of various data fields of an operation chain data that may allow heterogeneous data to be accessed in a uniform way. The component library 404 may consist of a number of process modules (e.g., the process module 408 of FIG. 4), a number of service modules (e.g., the service module 406 of FIG. 4), and a number of agent modules (e.g., the agent module 410 of FIG. 4), each component of the component library may be provided to perform to perform a set of functions on the supply chain data.

The service modules 406 may perform a set of functions on data object (e.g., the data object 402 of FIG. 4) of an operations chain data to support other components associated with architecture of the application of a operations chain.

The process module 408 analyze a portion of the operations chain data supplied by the service module 406 to produce a set of output data to display on a user interface and to identify a set of activities to perform on the operations chain data. The agent modules 410 may synchronize execution of the process module 408, may perform the set of activities identified by the process module 408, and/or may apply decision making logic on the operations chain data to achieve an objective of the operations chain. The template library 412 may create a customized application to perform a set of definable tasks. The templates 414 may be email template, role template, process template, and view template, each template to perform a various definable tasks.

The application modules 416 may enable development of customizable applications. The application modules 416 may also select a template 414 from a template library 412, and/or from a component library 404 to embed the template 414. The solver module 418 may provide a solution to a potential disruption in the supply chain through manipulation of the supply chain data. The role module 420 may define a set of roles of various users of the supply module (e.g., supply module 100 of FIG. 1) such that the various users have a limited set of capabilities based on their role in the supply chain.

In the example embodiments illustrated in FIG. 4, the data object library 400 communicates with the component library 404. The component library 404 as illustrated in embodiments of FIG. 4, communicates with the data object library 400, template library 412, the application module 416 and solver module 418. The application module 416 also communicates with the role module 420. The solver module 418 interacts with the 416 application module according to the embodiment illustrated in FIG. 4.

A method includes providing a data object library (e.g., the data object library 400 of FIG. 4) having a group of data objects (e.g., the data objects 402 of FIG. 4) as collections of various data fields of a supply chain data. A component library having a number of process modules (e.g., the process module 408 of FIG. 4), a number of service modules (e.g., the service module 406 of FIG. 4), and a number of agent modules (e.g., the agent module 410 of FIG. 4), each component of the component library may be provided to perform an operation on various data objects of the data object library (e.g., the data object library 400 of FIG. 4) to produce an output of various data fields (e.g., the data field 302 of FIG. 3). A template library (e.g., the template library 412 of FIG. 4) may be provided.

A component of the component library may be selected and the component may be applied to a template (e.g., the template of the template library may be email template, role template, process template, and view template, each template to perform a various definable tasks) of the template library (e.g., the template library 412 of FIG. 4) to create a customized application to perform a set of definable tasks.

An application includes a service module (e.g., the service module 406 of FIG. 4) that may perform a set of functions on data object (e.g., the data object 402 of FIG. 4) of an operations chain data to support other components associated with architecture of the application of a operations chain. A process module (e.g., the process module 408 of FIG. 4) may analyze a portion of the supply chain data supplied by the service module (e.g., the service module 406 of FIG. 4) to produce a set of output data to display on a user interface and to identify a set of activities to perform on the supply chain data.

An agent module (e.g., a number of agent module may be distributed to the suppliers, contract manufacturers, and trading partners of the supply chain to enable remote control and/or access to a local data) having a set of instructions may synchronize execution of the process module (e.g., the process module 408 of FIG. 4), may perform the set of activities identified by the process module (e.g., the process module 408 of FIG. 4), and/or may apply decision making logic on the supply chain data to achieve an objective of the supply chain.

A number of the agent module (e.g., the agent module 410 of FIG. 4) may be distributed to more than one of suppliers, contract manufacturers, and trading partners of the supply chain to enable simultaneous execution of one of the agent module (e.g., the agent module 410 of FIG. 4). A number of the agent module (e.g., the agent module 410 of FIG. 4) may operate autonomously to achieve a set of objectives predefined by the supply chain. A number of the agent module (e.g., the agent module 410 of FIG. 4) may be automatically deployed to of suppliers, contract manufacturers, and trading partners of the operations chain.

A number of the agent module (e.g., the agent module 410 of FIG. 4) may travel between suppliers, contract manufacturers, plants, and trading partners of the supply chain. An execution of the agent module may be automatically triggered by schedule, notification of an external event, and receipt of a message. The agent module (e.g., the agent module 410 of FIG. 4) may securely communicate with suppliers, contract manufacturers, plants, trading partners, and other agent module. A paired one of the agent module (e.g., the agent module 410 of FIG. 4) may form a hierarchical relationship. The method may include defining an agent module (e.g., the agent module 410 of FIG. 4) of the application to communicate with another agent module (e.g., the agent module 410 of FIG. 4) of another entity involved in the operations of the entity.

Figure 5:
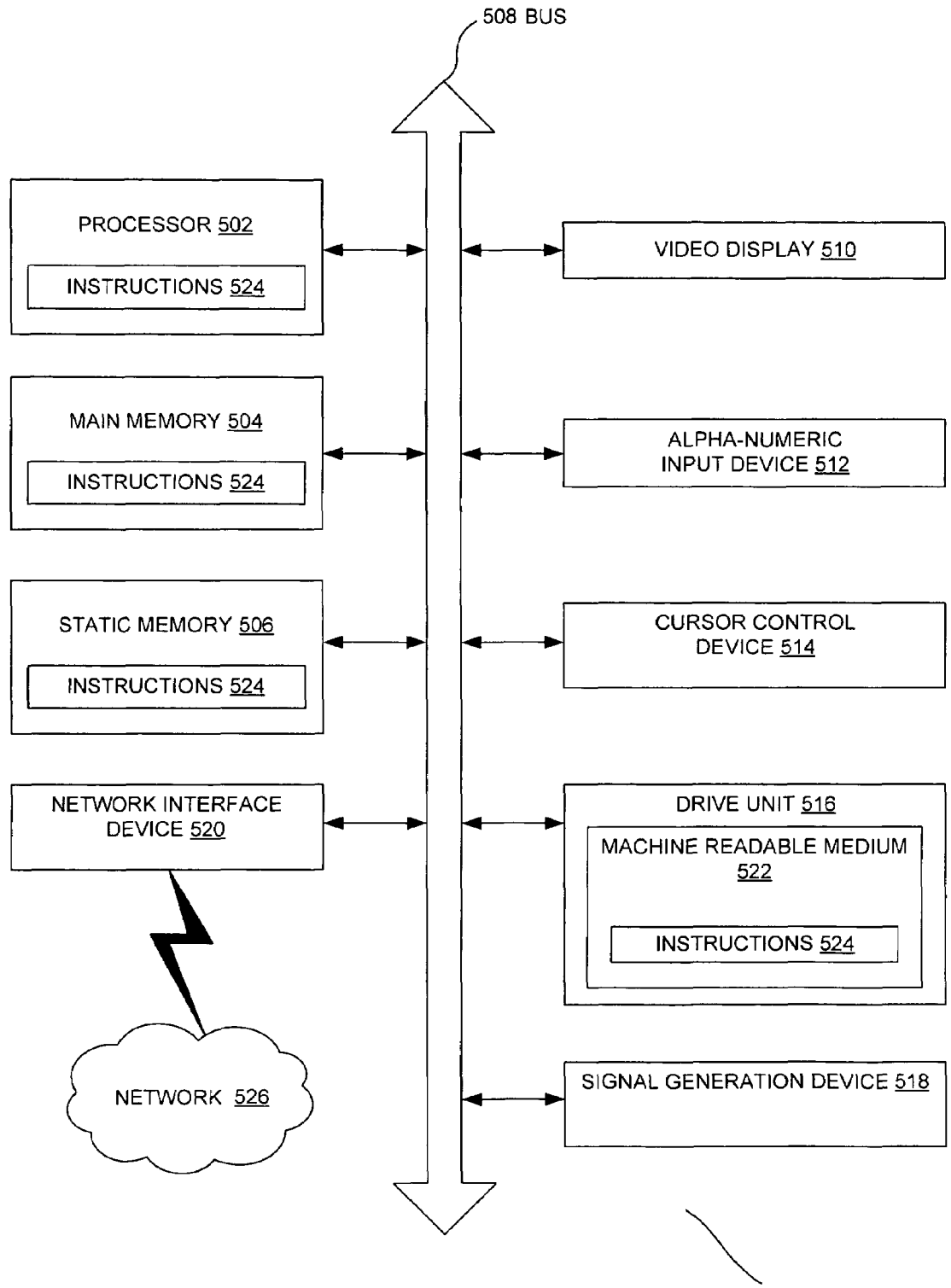
FIG. 5 is a diagrammatic representation of a data processing system capable of processing a set of instructions to perform any one or more of the methodologies herein, according to one embodiment.

FIG. 5 is a diagrammatic system view of a data processing system 500 in which any of the embodiments disclosed herein may be performed, according to one embodiment. Particularly, the data processing system 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524, and a network 526, according to one embodiment. The data processing system 500 may indicate a personal computer and/or a data processing system in which one or more operations disclosed herein are performed.

The processor 502 may be microprocessor, a state machine, an application specific integrated circuit, a field programmable gate array, etc. (e.g., Intel® Pentium® processor). The main memory 504 may be a dynamic random access memory and/or a primary memory of a computer system. The static memory 506 may be a hard drive, a flash drive, and/or other memory information associated with the data processing system. The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped).

The cursor control device 514 may be a pointing device such as a mouse. The drive unit 516 may be a hard drive, a storage system, and/or other longer term storage subsystem. The signal generation device 518 may be a bios and/or a functional operating system of the data processing system. The network interface device 520 may perform interface functions (e.g., code conversion, protocol conversion, and buffering) required for communications to and from a network between a number of independent devices (e.g., of varying protocols). The machine readable medium 522 may provide instructions on which any of the methods disclosed herein may be performed. The instructions 524 may provide source code and/or data code to the processor 502 to enable any one/or more operations disclosed herein.

FIG. 6 is an interaction diagram view of a process flow of a database 600, a supply module 100, and an entity 602, according to one embodiment. In operation 604, a database language is provided (e.g., to search, query, and/or manipulate data in the database 600). In operation 606, a supply chain data is stored in database tables. In operation 608, a model of a supply chain is created. In operation 610, business objects are created from the model of the supply chain (e.g., virtual business objects) and the supply chain data. In operation 612, an XML-based language is created. In operation 614, the supply module 100 is populated with predefined service modules, process modules, and agent modules. In operation 616, validation rules, replenishment rules, and policies are inputted by the entity 602 into the supply module 100. In operation 618, the validation rules, replenishment rules, and policies are incorporated into business objects of the supply module 100.

In operation 620, custom alerts are defined. In operation 622, service modules are built based on the custom alerts. In operation 624, the supply chain data is monitored for events by the service modules of the supply module 100. In operation 626, processes, agents, and rules for services are defined using business objects and the XML-based language. In operation 628, process modules and agent modules are built by the supply module 100. In operation 630, dynamic filters are defined using business objects and the XML-based language. In operation 632, custom views are defined using business objects and the XML-based language. In operation 634, dynamic filters and custom views are instantiated by the supply module 100.

In operation 636, a template is selected (e.g., from a template library (e.g., the template library 412 as illustrated in FIG. 4)). In operation 638, service modules, process modules, agent modules, and business objects are selected. In operation 640, dynamic filters are selected and embedded into the template. In operation 642, a user interface (e.g., view) is selected. In operation 644, a custom application is developed. In operation 646, commands expressed in the XML-based language are converted into instructions expressed in the database language. In operation 648, the instructions are executed on the database.

FIG. 7 is an exploded view of a constraint module 204, according to one embodiment. Particularly, FIG. 7 illustrates a supply chain data 700, business policies 702, key performance indicators 704, alerts 706, replenishment rules 708, and validation rules 710, according to one embodiment.

The supply chain data 700 may be data associated with planning, implementing, and controlling the operations of the supply chain with the purpose to satisfy customer requirements. The business policies 702 may compare with various values in the supply chain data to optimize the flow of materials in a supply chain. The key performance indicators 704 may be financial and non-financial metrics used to quantify objectives that may reflect the strategic performance of an organization with the purpose to satisfy customer requirements.

The alert 706 may provide a notification of an event of the supply chain data and/or may enable management of the event. The replenishment rules 708 may compare with and/or to adjust various values in the supply chain data to plan an inventory. The validation rules 710 may compare with and/or may verify various values in the supply chain data to enable management of a potential disruption in a flow of materials in the supply chain.

In the example embodiment illustrated in FIG. 7, the supply chain data may communicate with the data structure module 308 through constraint module 204. The business policies 702 communicates with the data structure module 308 through constraint module 204 with the data structure module 308 through constraint module 204 according to the example embodiment of FIG. 7. The key performance indicators 704 also communicate with the data structure module 308 through constraint module 204. The alerts 706 illustrated in FIG. 7, interacts with the data structure module 308 through constraint module 204. In addition, in the example embodiments illustrated in FIG. 7, the replenishment rules 708 communicates with the data structure module 308 through constraint module 204. Also, the validation rules 712 communicate with the data structure module 308 through constraint module 204.

A set of validation rules may be defined of the condensed data structure to compare with and/or may verify various values in the supply chain data to enable management of a potential disruption in a flow of materials in the supply chain.

A set of replenishment rules may be defined of the condensed data structure to compare with and/or may adjust various values in the supply chain data to plan an inventory. Moreover, a set of policies may be defined of the condensed data structure to compare with various values in the supply chain data to optimize the flow of materials in a supply chain.

FIG. 8 is table view of the table view 800, according to one embodiment. Particularly, FIG. 8 illustrates a purchaser field 802, an item field 804, a date ordered field 806, a date delivered field 808, and a delivery location field 810, according to one embodiment. The table view 800 may include information related to the purchase details of the products delivered to the customer (e.g., the customer 122 of FIG. 1). The purchaser field 802 may display an identifier referencing a particular purchase (e.g., the customer 122 of FIG. 1) of the product from the company.

The item # field 804 may indicate the item code of the particular item purchased by the purchaser (e.g., the customer 122 of FIG. 1). The date ordered field 806 may indicate the item ordered date by the purchaser (e.g., the customer 122 of FIG. 1). The date delivered field 808 may indicate the date on which the item is delivered to the purchaser (e.g., purchaser 802 of FIG. 8) referencing to the order placed by the customer (e.g., the customer 122 of FIG. 1). The delivery location field 810 may display the location of delivery of the item by the firm to the purchaser (e.g., the purchaser 802 of FIG. 8) referencing the order.

The purchaser field 802 displays "purchaser 1" in the first row, "purchaser 2" in the second row and "purchaser 3" in the third row of the purchaser field 802 column of the table view 800 as illustrated in FIG. 8. The item # field 804 displays "33444" in the first row and "44333" in the second row of the item # field 804 column of the table view 800 as illustrated in FIG. 8.

The date ordered field 806 displays "9/1/06" in the first row of the date ordered field 806 column of the table view 800 as illustrated in FIG. 8. The date delivered field 808 displays "10/1/06" in the first row of the date delivered field 808 column of the table view 800 as illustrated in FIG. 8. The delivery location field 810 displays "site 3" in the first row of the delivery location field 810 column of the table view 800 as illustrated in FIG. 8.

FIG. 9 is a virtual business object view 900 of virtual relationships 904A-N between virtual business objects 902A-N, according to one embodiment. Particularly, the virtual business object view 900, virtual business objects 902A-N, and virtual relationships 904A-N.

The virtual business object view 900 may be a data structure view (e.g., an XML-based model of relational data) of the supply chain illustrating condensed abstract data structures having various virtual data types (e.g., character strings, integers, floating point numbers, custom data types, etc.) of supply chain data fields (e.g., to be implemented with actual supply chain data). Virtual business objects 902A-N may be condensed abstract data structures associated with actual business objects and actual supply chain data fields and supply chain data (e.g., multiple business objects are instantiated from a virtual business object of the virtual business objects 902A-N, various children business objects are derived from a parent virtual business object of the virtual business objects 902A-N, the virtual data types of virtual business objects 902A-N are assigned actual values of supply chain data when a business object is instantiated from virtual business objects 902A-N). The virtual relationship 904A-N may be a connection (e.g., inheritance, type-of association (e.g., one virtual business object is a type of another business object), is-a association (e.g., two virtual business objects are of the same type but with different data), etc.) between virtual data types of virtual business objects 902A-N).

FIG. 10 is a business object view 1000 of relationships 1004A-N between business objects 1002A-N, according to one embodiment. Particularly, FIG. 10 illustrates business objects 1002A-N, relationships 1004A-N, and data fields 1006A-N, according to one embodiment.

The business object view 1000 may be a data structure view of a model of the operations chain of the entity. Business objects 1002A-N may be condensed data structures (e.g., instances of virtual business objects which may be inherited, related, and/or derived from an another virtual business object (e.g., virtual business objects 902A-N of FIG. 9)) associated with the supply chain data (e.g., to be used to generate the language having a modular, adaptive function syntax). Relationships 1004A-N may be connections (e.g., inheritance, type-of association (e.g., one business object is a type of another business object), is-a association (e.g., two virtual business object are of the same type but with different data), etc.) between data fields of the business objects 1002A-N. Data fields 1006A-N may be supply chain data variables associated with at least one business object of business objects 1002A-N and/or at least one relationship of relationships 1004A-N. Business objects 1002A-N and/or relationships 1004A-N may facilitate expression of a schema (e.g., a schema of XML documents) through the schema language syntax (e.g., elements, children elements, attributes, entities, namespaces, CDATA (character data), PCDATA (any type of parseable data), data types, constraints on content, constraints on data type, etc.). The schema may provide a semantic structure (e.g., common semantics/syntax) of a computer language (e.g., XML-based query language, XML-based translation language, XML-based markup language, etc.)

A Supply chain data (e.g., values associated with data fields of the business objects 1002A-N and/or a supply chain variable) of a relational database may be associated with a condensed data structure (e.g., business objects 1002A-N, virtual business objects 902A-N of FIG. 9 at an abstract level). A schema of the condensed data structure (e.g., an XML schema based on the business objects and/or the relationships 1004A-N between various data fields 1006A-N) may be defined to describe the supply chain data (e.g., as grouped in business objects 1006A-N). A language may be provided, which may have an adaptive, modular function oriented syntax that may be specified by the expression of the schema. A mapping (e.g., a translation) may be provided between the language and a database language to enable interaction with the supply chain data. A sequence of executable instructions may be generated in the database language from a function expressed in the language to apply the function on the supply chain data.

FIG. 11 is an interface view of an application 1100, components 1102, a dynamic filter 1106, and a solver module 1112, according to one embodiment. Particularly, FIG. 11 illustrates the application 1100, the components 1102, a production component 1104, a dynamic filter 1106, a reset filter indicator 1108, a apply filter indicator 1110, a solver module 1112, and the component indicators 1114A-N, according to one embodiment.

The application 1100 may be a graphical user interface and/or a collection of components (e.g., service modules, agent modules, business objects, process modules, etc.) to achieve a set of objectives of the entity. Components 1102 may be reconfigurable software modules (e.g., process an input of supply chain data and business objects produce an output of data) which may be used to dynamically customize the application 1100 (e.g., embed in and/or remove from the application 1100). The production component 1104 may be a separate, collapsible table of information associated with a set of production characteristics for at least one item (e.g., item description, quantity, supplier, lead time, delivery data, action, status, etc.). The dynamic filter 1106 may be a reconfigurable group of business objects (e.g., modification by addition and/or deletion of business objects) in menu form (e.g., menu of data fields associated with a business object) to further focus the output of data of components 1102. The reset filter indicator 1108 may instantiate the dynamic filter 1106 as it was recently defined (e.g., undo all recent modifications to the dynamic filter). The apply filter 1110 may execute the dynamic filter 1106 on the components 1102 of the application 1100. The solver module 1112 may be a software module to manipulate the supply chain data in order to resolve potential disruptions in the supply chain (e.g., inconsistencies, conflicts, violations of replenishment rules, violations of business policies, violation of validation rules, etc.). Component indicators 1114A-N may be display an exploded, collapsible table of the output of data of a component of components 1102.

An inconsistency in the supply chain data may be automatically identified to enable management of the potential disruption in the flow of materials in the supply chain. Moreover, A violation of the validation rules, a violation of the replenishment rules, and/or a violation of the policies of the supply chain data may be automatically identified to enable management of the potential disruption in the flow of materials in the supply chain. A conflict in the supply chain data may be automatically identified when a particular item exceeds a customizable threshold parameter to enable management of the potential disruption in the flow of materials in the supply chain.

A stored procedure (e.g., the solver module 418 of FIG. 4, the solver module 1112 of FIG. 16, the service module 406A-N, the process module 408A-N of FIG. 4, and/or the agent module 410A-N of FIG. 4) may be referenced to resolve at least one violation of the replenishment rules, conflict, inconsistency, violation of the validation rules, and violation of the policies.

In yet another embodiment, any inconsistency, conflict, violation of the replenishment rules, violation of the validation rules, and/or violation of the policies may be automatically resolved through execution of a series of instructions expressed in the language to manipulate the supply chain data to produce at least one acceptable replacement value.

FIG. 12 is an interface view of a view base definition 1200, according to one embodiment. Particularly, FIG. 12 illustrates the view base definition 1200, a source business object field 1202, a business object 1204, and data fields 1206A-N, according to one embodiment.

The view base definition 1200 may display a particular arrangement of supply chain data (e.g., expressed in a XML document). The view base definition 1200 may include a style sheet associated with the supply chain data (e.g., an XML style sheet to process the XML document to a target layout). The source business object field 1202 may be a data field to display and/or to input the location of the source business object of the model of the supply chain. The business object 1204 may be collapsible, exploded view of the source business object 1202. Data fields 1206A-N may be supply chain data variables associated with the source business object 1202.

A customized view of the supply chain data may be configured by defining the sequence of instructions expressed in the language to display a particular arrangement of the supply chain data to create a collapsible view table.

FIG. 13 is an interface view of a dynamic filter definition 1300, according to one embodiment. Particularly, FIG. 13 illustrates the dynamic filter definition 1300, a filter operations configuration 1302, a filter field 1304, a business object relation field 1306, and a dynamic filter value field 1308, according to one embodiment.

The dynamic filter definition 1300 may be a graphical user interface to create a dynamic filter of an application (e.g., a reconfigurable group of business objects in menu form modifiable by addition and/or deletion of business objects) to further focus the output of data of components. The filter operations configuration 1302 may be a table for creating, modifying, and/or deleting dynamic filter operations (e.g., relational operations, Boolean operations, calculation operations, etc.) of the dynamic filter. The filter field 1304 may enable configuration (e.g., creation, reconfiguration, modification, etc.) of a dynamic filter by selection of a data field from a menu of business objects. The business object relation field 1306 may be a menu of related business objects of the dynamic filter. The dynamic filter value field 1308 may require the input of a value for the filter field 1304 and/or associate a default value with the filter field 1304.

The dynamic filter of the supply chain data may be instantiated by defining a sequence of instructions expressed in a language (e.g., to further focus on specific identified criteria to create a collapsible summary table.

FIG. 14 is an interface view of an alert type definition 1400, according to one embodiment. Particularly, FIG. 14 illustrates the alert type definition 1400, an alert business object field 1402, a trigger mode field 1404, a trigger business object field 1406, a trigger event field 1408, a related business object field 1410, an alert mapping field 1412, and an alert message field 1414, according to one embodiment.

The alert type definition 1400 may be a graphical user interface to configure (e.g., create, modify, adjust, describe, etc.) custom alerts. The alert business object field 1402 may display an identification of a business object that defines the custom alert (e.g., contains a data related to the custom alert). The trigger mode field 1404 may define the method of triggering the alert (e.g., notification of an event by communication (e.g., email, message, phone, etc.), alarm notification of the event, schedule). The trigger business object field 1406 may enable selection of a business object containing event data. The trigger event field 1408 may enable selection of a value of the event contained in the business object containing even data. The related business object field 1410 may provide a menu of business objects and/or virtual business objects related to the alert business object of the alert business object field 1402 (e.g., related by inheritance, derivation, association, is-a relationship (e.g., one virtual business object is a type of another business object), type-of relationship (e.g., two virtual business object are of the same type but with different data), etc.). The alert mapping field 1412 may provide information on a mapping of the alert (e.g., customizable alert) with data (e.g., specific data values) of the alert business object. The alert message field 1414 may provide information on a list of messages propagated for the alert (e.g., for different events, for different users, etc.).

A customized alert may be configured to provide a notification of an event of the supply chain data and to enable management of the event, wherein the customized alert is defined in any condensed data structure.

Figure 15:
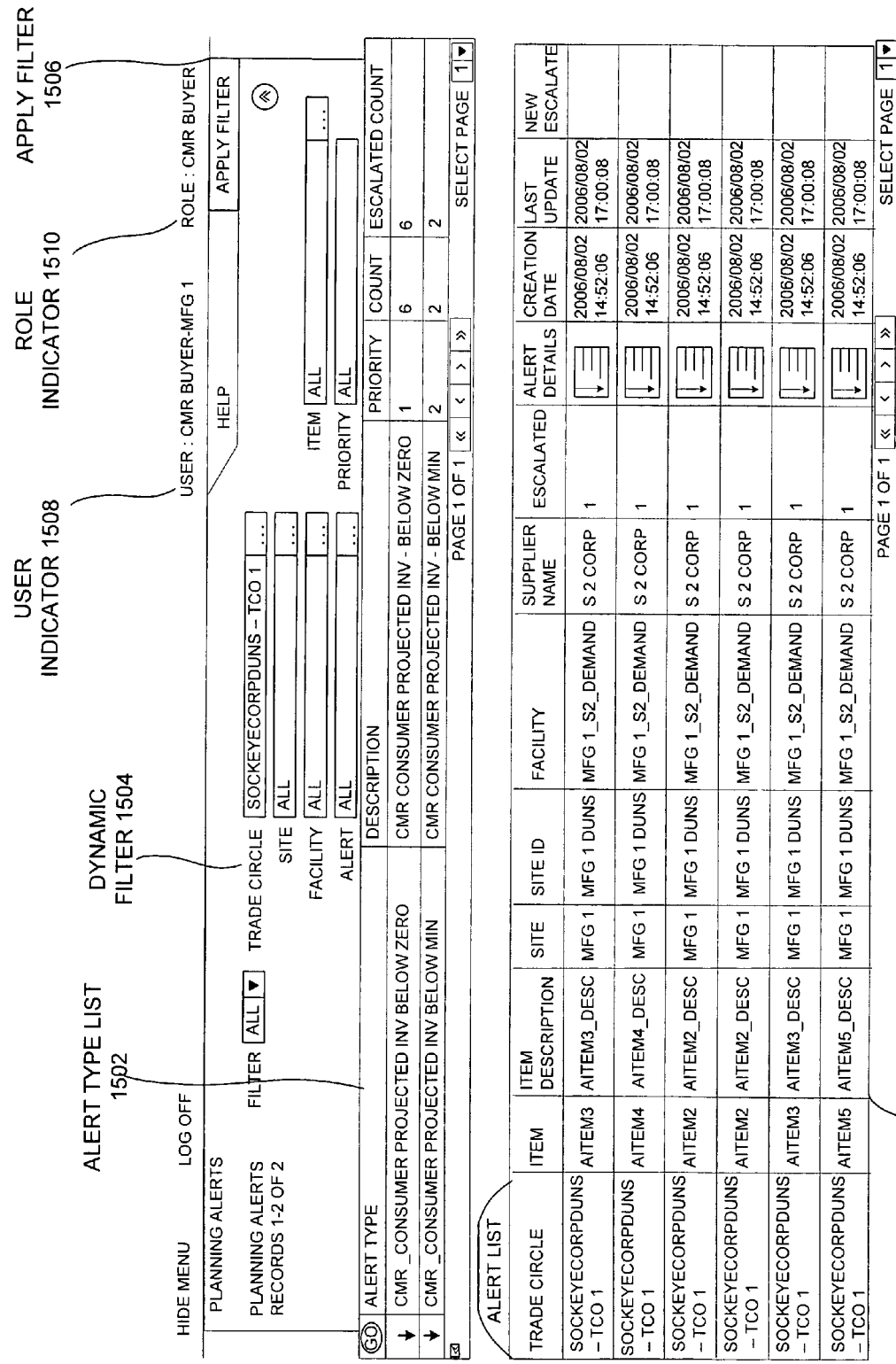
FIG. 15 is an interface view of a planning alert list, according to one embodiment.

FIG. 15 is an interface view of a planning alert list 1500, according to one embodiment. Particularly, FIG. 15 illustrates the planning alert list 1500, an alert type list 1502, a dynamic filter 1504, an apply filter 1506, a user indicator 1508, and a role indicator 1510, according to one embodiment.

The planning alert list 1500 may provide information (e.g., trade circle, item, site, facility, associated business objects, supplier, escalated, creation date, alert details, etc.) of planning alerts (e.g., inventory planning, production planning, order planning, etc.) of the supply chain. The alert type list 1502 may be a collapsible table of information (priority, count, escalated count, alert type description, etc.) of types (e.g., consumer projected inventory below zero, consumer projected inventory below minimum, etc.) of the planning alerts. The dynamic filter 1504 may be a reconfigurable group of business objects (e.g., modification by addition and/or deletion of business objects) in menu form (e.g., menu of data fields associated with a business object) to further focus the output of data of service modules (e.g., alerts). The apply filter 1506 may execute the dynamic filter 1504 on the planning alert list 1500 and/or the alert type list 1502. The user indicator 1508 may provide information of a user of the planning alert list 1500 and alert type list 1502. The role indicator 1510 may provide information of a role of the user of the planning alert list 1500 and alert type list 1502.

FIG. 16 is an environment view of a trading environment 1600, according to one embodiment. Particularly, FIG. 16 illustrates an enterprise 1602, suppliers 1604, trading partners 1606, contract manufacturers 1608, a VMI (vendor managed inventory) 1610, a facility 1612, a warehouse 1614, a plant 1616, a distributors 1618, and customers 1620 according to one embodiment.

The enterprise 1602 may be a venture (e.g., a manufacturing and/or production company, a civil engineering and/or maintenance company, an endeavor, a project, a risk, organization led by an entrepreneur, a business and/or an activity handling firm) that may provide service and/or products to various components of the supply chain. The suppliers 1604 may be a coordinated system of organizations, people, activities, information and/or resources that may be involved in moving a product or service in physical or virtual manner through the supply chain.

The trading partners 1606 may be involved the voluntary exchange of goods, services and/or both in the supply chain. The contract manufacturers 1608 may be a firm that manufactures components and/or products (CNC machining, complex assembly, aluminum die casting, grinding, broaching, gears, and/or forging) for another "hiring" firm (e.g., aerospace, defense, computer, semiconductor, energy, medical and/or automotive fields) in a supply chain.

The VMI 1610 may be an individual, a corporation and/or a business group that may help to foster a closer understanding between the supplier and manufacturer may be by using Electronic Data Interchange and other statistical methodologies to forecast and maintain correct inventory in the supply chain. The facility 1612 may be. The warehouse 1614 may be a commercial building for storage of goods and may be used by manufacturers, importers, exporters, wholesalers, transport businesses and/or customs.

The plant 1616 may be sector of a company and/or organization that may involve various chemical and/or mechanical steps to aid in the manufacture of an item(s) that may be carried out on a very large scale. The distributors 1618 may be a middleman (e.g., may be a chain of intermediaries, each passing the product down the chain to the next organization, before it finally reaches the consumer or end-user) between the manufacturer and retailer who may store product manufactured by a factory in a supply chain. The customers 1620 may be one who makes use and/or receives of the products and/or services of an individual and/or organization.

In the example embodiment illustrated in FIG. 16 the enterprise 1602 may communicate with the supplier 1604, the contract manufacturers 1608, series of contract manufacturer 1608, the (VMI) vendor managed inventory 1610, the facility 1612, the warehouse 1614, the distributors 1618 and the supplier 1604. The trading partners 1606 may communicate with the contract manufacturers 1608. The contract manufacturers 1608 may communicate with the VMI 1610 according to the example embodiment illustrated in FIG. 16. In FIG. 16, the VMI (vendor managed inventory) 1610 may communicate with the facility 1612. The warehouse 1614 may communicate with the plant 1616. The distributors may communicate with the customers 1620 in the example embodiment illustrated in FIG. 16.

Figure 17A:
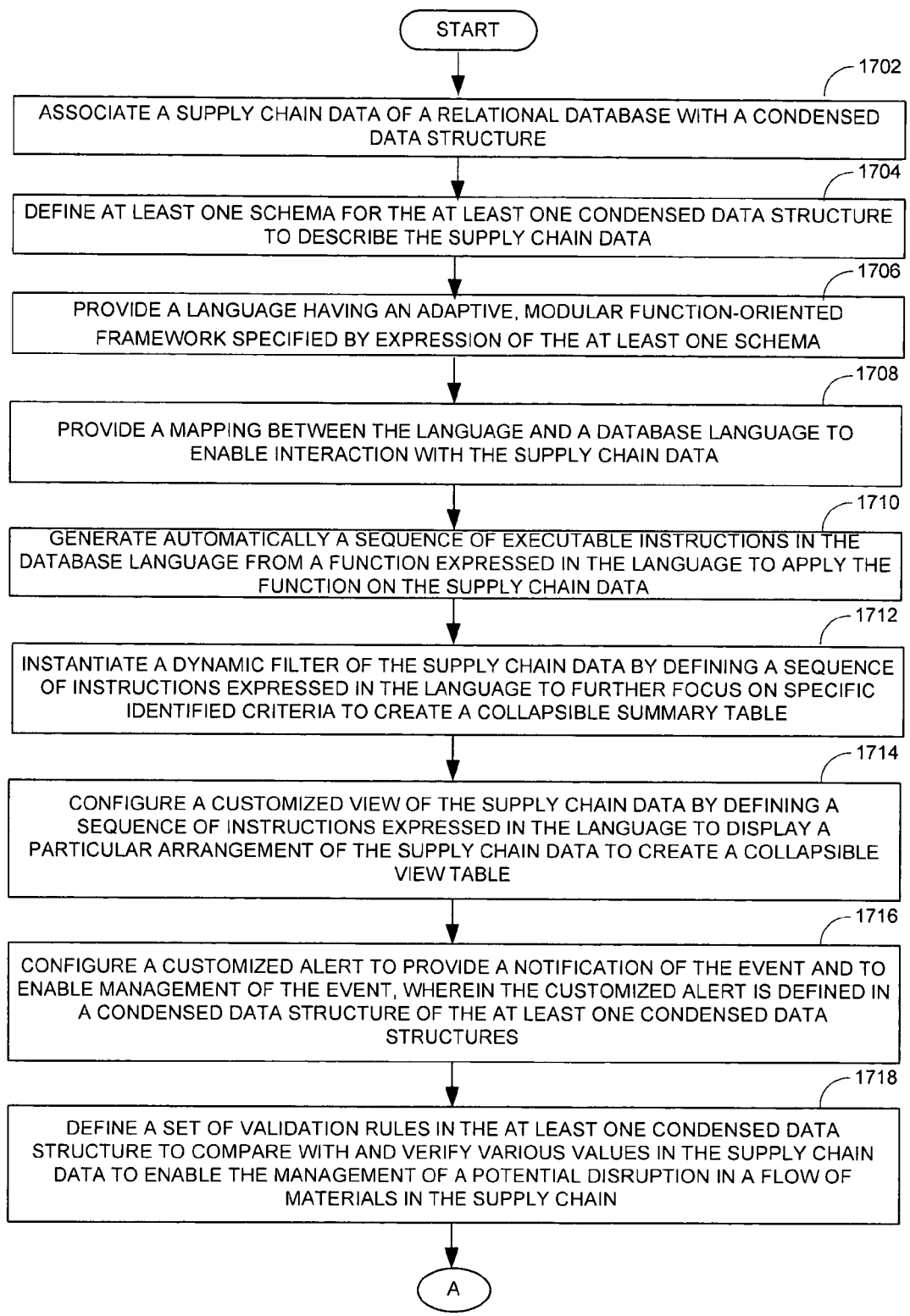
FIG. 17A is a process flow of associating a supply chain data of a relational database, according to one embodiment.

FIG. 17A is a process view of associating a supply chain data (e.g., a supply chain database 224 of FIG. 17A is a process view of associating a supply chain data (e.g., the supply chain database 224 of FIG. 2) of a relational database, according to one embodiment. In operation 1702, a supply chain data (e.g., the supply chain database 224 of FIG. 2) of a relational database may be associated with at least one condensed data structure (e.g., the data structure module 314 of FIG. 3). In operation 1704, at least one schema may be defined for the at least one condensed data structure (e.g., the data structure module 308 of FIG. 3) to describe the supply chain data (e.g., the supply chain database 224 of FIG. 2).

In operation 1706, a language having an adaptive, modular function oriented syntax may be provided specified by expression of the at least one schema. In operation 1708, a mapping between the language and a database language may be provided to enable interaction with the supply chain data (e.g., the supply chain database 224 of FIG. 2). In operation 1710, a sequence of executable instructions in the database language may be generated automatically from a function expressed in the language to apply the function on the supply chain data (e.g., the supply chain database 224 of FIG. 2).

In operation 1712, a dynamic filter of the supply chain data (e.g., the supply chain database 224 of FIG. 2) may be instantiated by defining a sequence of instructions expressed in the language to further focus on specific identified criteria to create a collapsible summary table. In operation 1714, a customized view of the supply chain data (e.g., the supply chain database 224 of FIG. 2) may be customized by defining the sequence of instructions expressed in the language to display a particular arrangement of the supply chain data (e.g., the supply chain database 224 of FIG. 2) to create a collapsible view table.

In operation 1716, a customized alert may be configured to provide a notification of an event of the supply chain data (e.g., the supply chain database 224 of FIG. 2) and to enable management of the event. In operation 1718, a set of validation rules in the at least one condensed data structure (e.g., the data structure module 308 of FIG. 3) to compare with and to verify various values in the supply chain data (e.g., the supply chain database 224 of FIG. 2) may be defined to enable management of a potential disruption in a flow of materials in the supply chain.

Figure 17B:
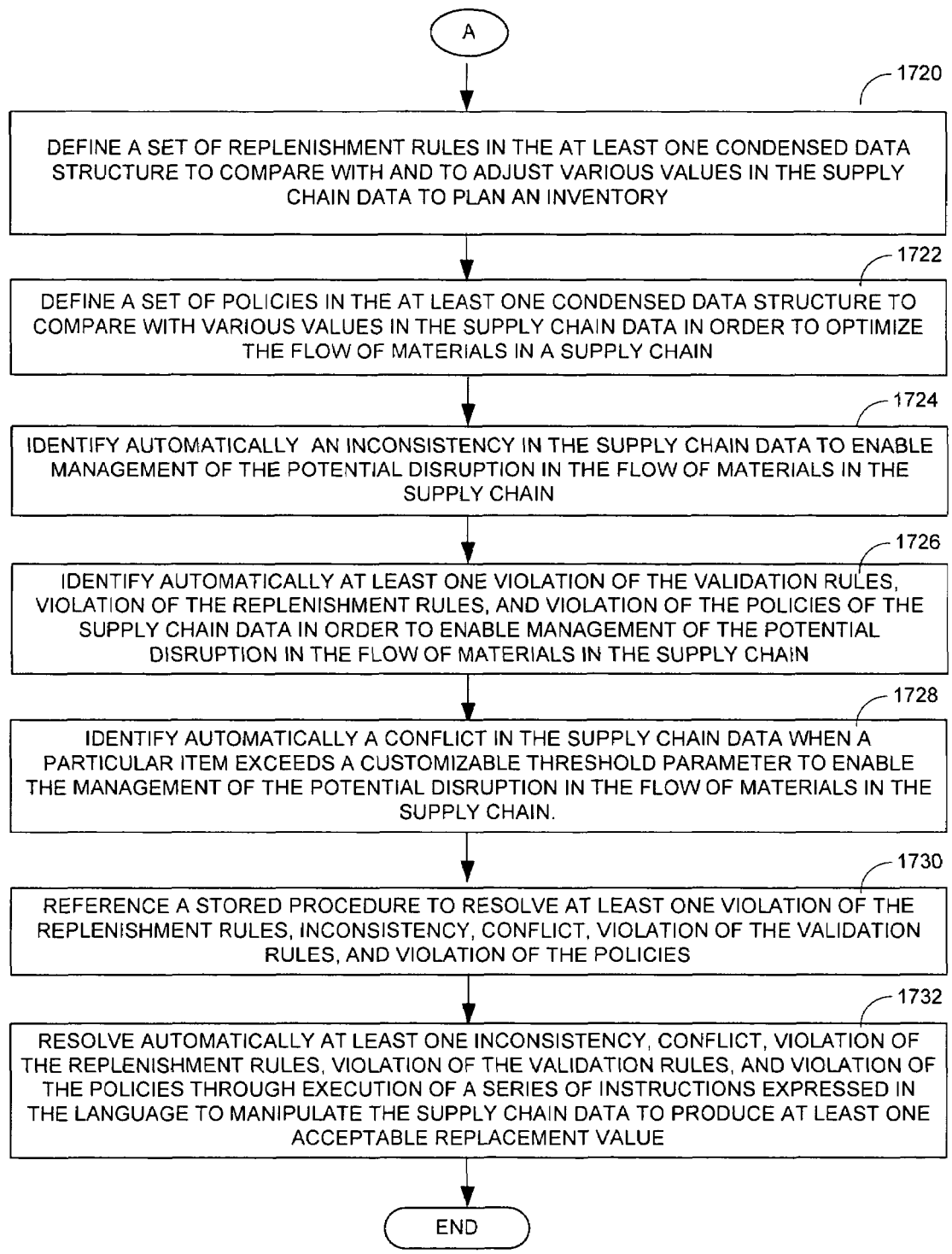
FIG. 17B is a continuation process flow of FIG. 17A illustrating additional processes, according to one embodiment.

FIG. 17B is a continuation process flow of FIG. 17A illustrating additional processes, according to one embodiment. In operation 1720, a set of replenishment rules in the at least one condensed data structure (e.g., the data structure module 308 of FIG. 3) to compare with and to adjust various values in the supply chain data (e.g., the supply chain database 224 of FIG. 2) may be defined to plan an inventory. In operation 1722, a set of policies in the at least one condensed data structure (e.g., the data structure module 308 of FIG. 3) to compare with various values in the supply chain data (e.g., the supply chain database 224 of FIG. 2) may be defined to optimize the flow of materials in a supply chain.

In operation 1724, an inconsistency in the supply chain data (e.g., the supply chain database 224 of FIG. 2) may be automatically identified to enable management of the potential disruption in the flow of materials in the supply chain. In operation 1726, at least one violation of the validation rules, violation of the replenishment rules, and violation of the policies of the supply chain data (e.g., the supply chain database 224 of FIG. 2) may be automatically identified to enable management of the potential disruption in the flow of materials in the supply chain. In operation 1728, a conflict in the supply chain data (e.g., the supply chain database 224 of FIG. 2) may be automatically identified when a particular item exceeds a customizable threshold parameter to enable management of the potential disruption in the flow of materials in the supply chain.

In operation 1730, a stored procedure may be referenced to resolve at least one violation of the replenishment rules, conflict, inconsistency, violation of the validation rules, and violation of the policies. In operation 1732, at least one inconsistency, conflict, violation of the replenishment rules, violation of the validation rules, and violation of the policies may be automatically resolved through execution of a series of instructions expressed in the language to manipulate the supply chain data (e.g., the supply chain database 224 of FIG. 2) to produce at least one acceptable replacement value.

Figure 18A:
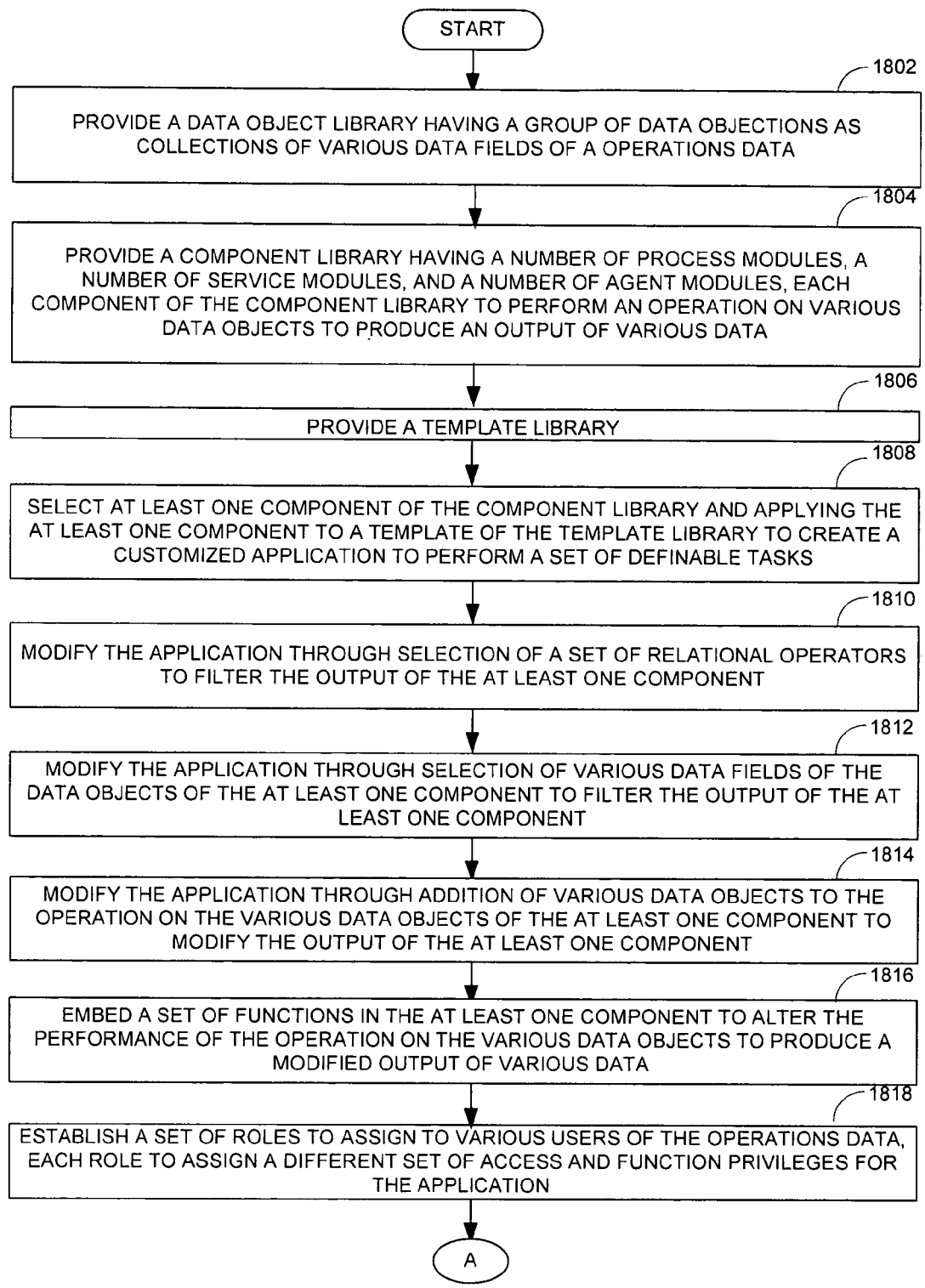
FIG. 18A is a process flow of providing a data object library having a group of data objects, according to one embodiment.

FIG. 18A is a process flow of providing a data object library (e.g., the data object library 400 of FIG. 4) having a group of data objects, according to one embodiment. In operation 1802, a data object library (e.g., the data object library 400 of FIG. 4) having a group of data objects may be provided as collections of various data fields of an operations chain data. In operation 1804, a component library (e.g., the component library 404 of FIG. 4) having a number of process modules, a number of service modules (e.g., the service module 406 of FIG. 4), and a number of agent modules, each component of the component library may be provided to perform an operation on various data objects of the data object library (e.g., the data object library 400 of FIG. 4) to produce an output of various data fields (e.g., the data field 302 of FIG. 3).

In operation 1806, a template library (e.g., the template library 412 of FIG. 4) may be provided. In operation 1808, at least one component of the component library (e.g., the component library 404 of FIG. 4) may be selected and at least one component may be applied to a template of the template library (e.g., the template library 412 of FIG. 4) to create a customized application to perform a set of definable tasks. In operation 1810, the application may be modified through selection of a set of relational operators to filter the output of the at least one component.

In operation 1812, the application may be modified through selection of various data fields (e.g., the data field 302 of FIG. 3) of the data objects (e.g., the data object 402 of FIG. 4) of the at least one component to filter the output of the at least one component. In operation 1814, the application may be modified through addition to the operation on the various data objects of the at least one component to modify the output of the at least one component. In operation 1816, a set of functions may be embedded in the at least one component to alter performance of the operation on the various data objects to produce a modified output of the at least one component.

In operation 1818, a set of roles may be established to assign to various users of the operations data, each role to assign a different set of access and function privileges for the application.

Figure 18B:
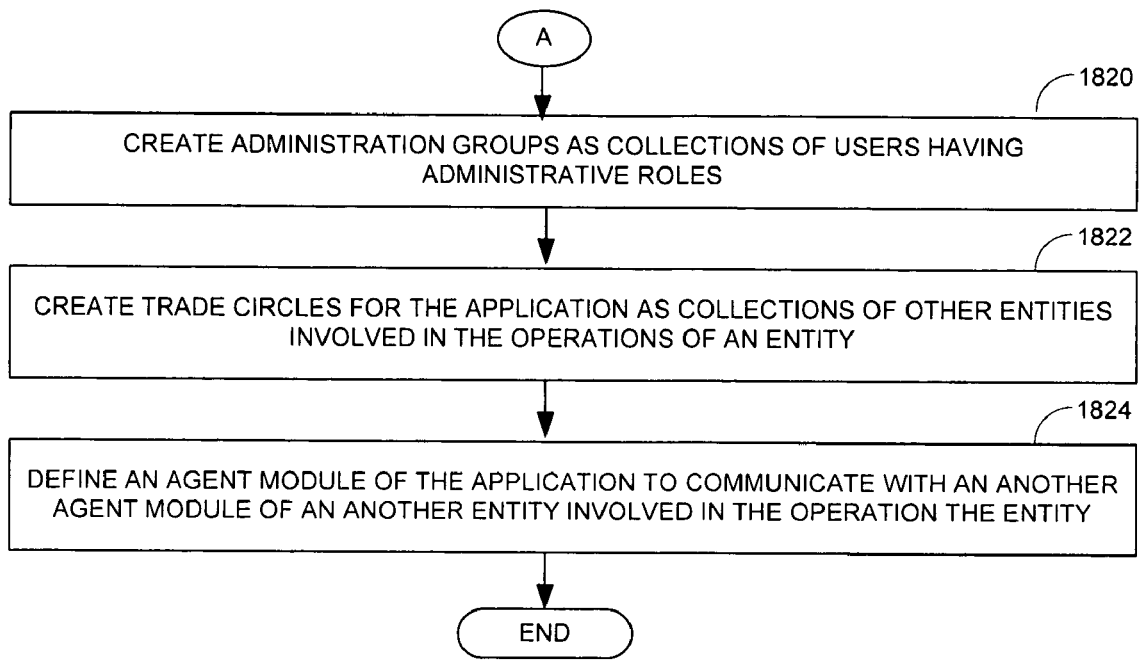
FIG. 18B is a continuation of process flow of FIG. 18A illustrating additional processes, according to one embodiment.

FIG. 18B is a continuation of process flow of FIG. 18A illustrating additional processes, according to one embodiment. In operation 1820, a group of administrators for the application may be created as collections of users having administrative roles. In operation 1822, trade circles for the application may be created as collections of other entities involved in the operations of an entity. In operation 1824, an agent module (e.g., the agent module 410 of FIG. 4) of the application may be defined to communicate with another agent module (e.g., the agent module 410 of FIG. 4) of another entity involved in the operations of the entity.

Figure 19:
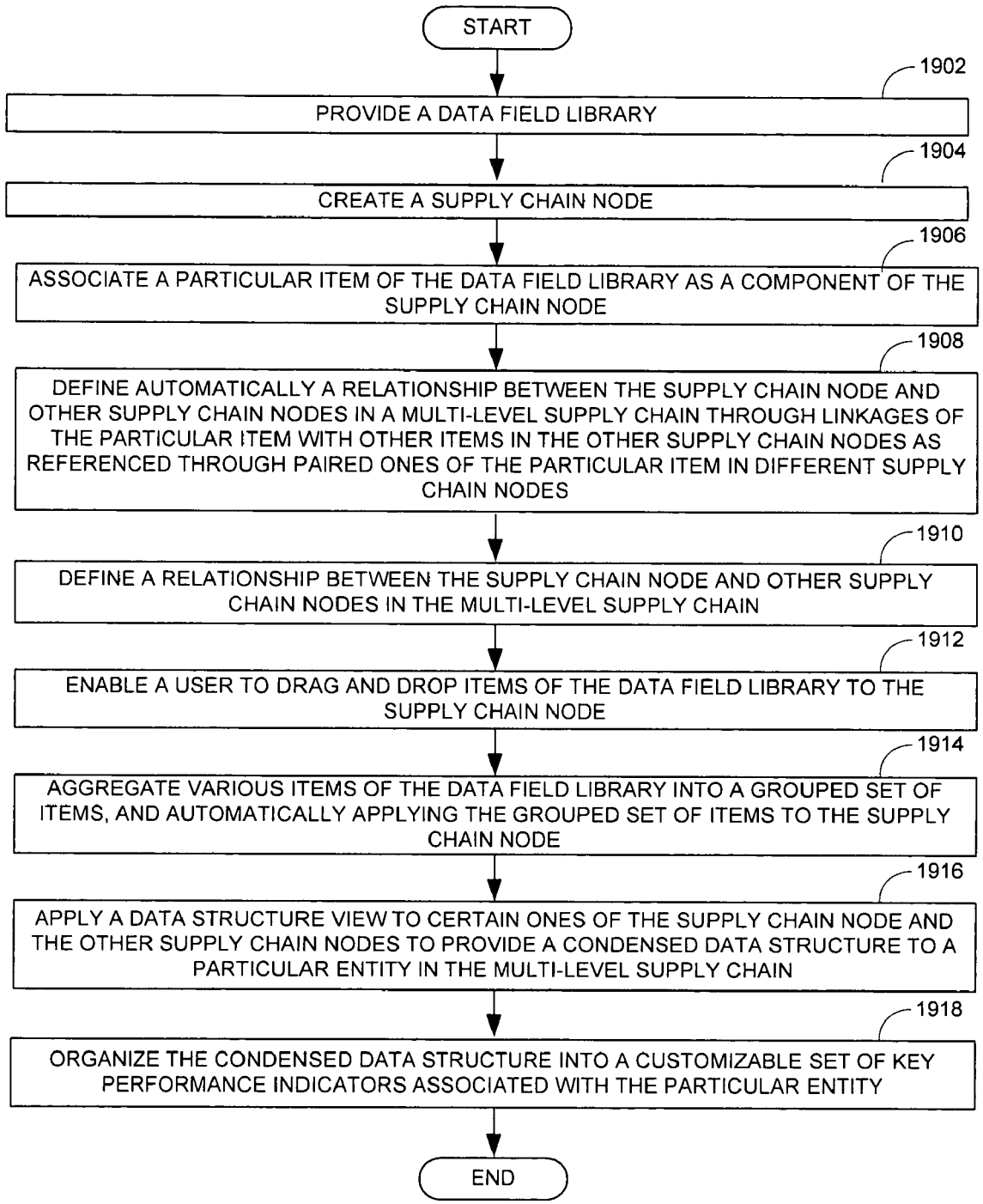
FIG. 19 is a process flow of providing a data field library, according to one embodiment.

FIG. 19 is a process flow of providing a data field library (e.g., the data field library 300 of FIG. 3), according to one embodiment. In operation 1902, a data field library (e.g., the data field library 300 of FIG. 3) may be provided. In operation 1904, a supply chain node (e.g., the node module 304 of FIG. 3) may be created. In operation 1906, a particular item of the data field library (e.g., the data field library 300 of FIG. 3) may be associated as a component of the supply chain node (e.g., the node module 304 of FIG. 3).

In operation 1908, a relationship between the supply chain node (e.g., the node module 304 of FIG. 3) and other supply chain nodes (e.g., the node module 304 of FIG. 3) in a multi-level supply chain may be defined automatically through linkages of the particular item with other items in the other supply chain nodes (e.g., the node module 304 of FIG. 3) as referenced through paired ones of the particular item in different supply chain nodes.

In operation 1910, a relationship may be defined between the supply chain node (e.g., the node module 304 of FIG. 3) and other supply chain nodes (e.g., the node module 304 of FIG. 3) in the multi-level supply chain. In operation 1912, a user may be enabled to drag and drop items of the data field library (e.g., the data field library 300 of FIG. 3) to the supply chain node (e.g., the node module 304 of FIG. 3). In operation 1914, various items of the data field library (e.g., the data field library 300 of FIG. 3) may be aggregated into a grouped set of items, and the grouped set of items may be applied automatically to the supply chain node (e.g., the node module 304 of FIG. 3).

In operation 1916, a data structure view (e.g., the data structure module 308 of FIG. 3) may be applied to certain ones of the supply chain node (e.g., the node module 304 of FIG. 3) and the other supply chain nodes (e.g., the node module 304 of FIG. 3) to provide a condensed data structure (e.g., the data structure module 308 of FIG. 3) to a particular entity in the multi-level supply chain. In operation 1918, the condensed data structure (e.g., the data structure module 308 of FIG. 3) may be organized into a customizable set of key performance indicators associated with the particular entity.

Figure 20:
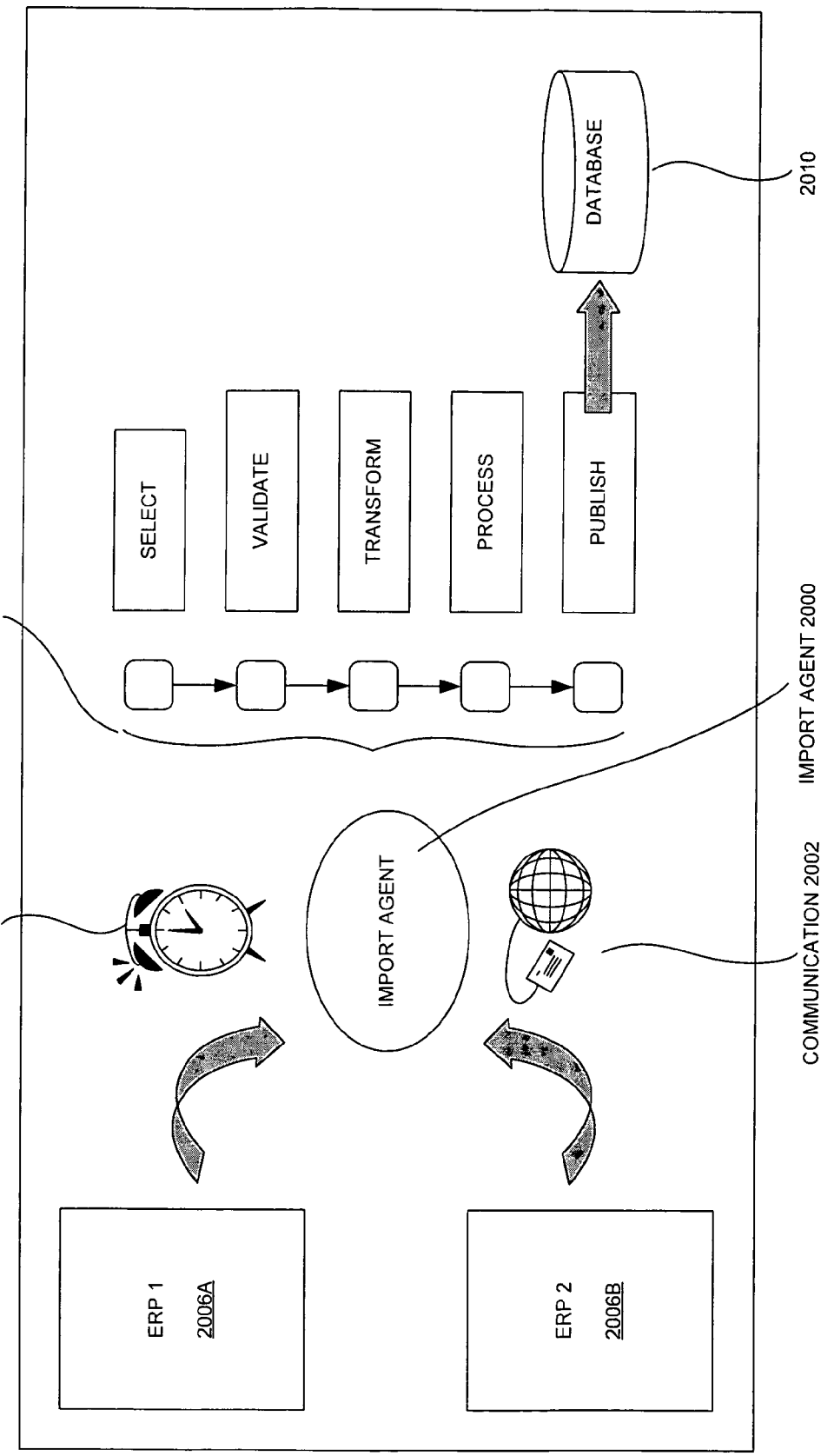
FIG. 20 is an agent view of an import agent, according to one embodiment.

FIG. 20 is an agent view of an import agent 2000, according to one embodiment. Particularly, FIG. 20 illustrates the import agent 2000, a communication 2002, an alarm 2004, ERP modules 2006A-B, activities 2008, and a database 2010, according to one embodiment.

The import agent 2000 may be an agent module to integrate systems processes (e.g., aggregate data from different systems and transfer them to a target database). The communication 2002 may be a notification (e.g., email, message, signal, etc) to initiate the import agent 2000 (e.g., to start the import agent 2000 automatically). The alarm 2004 may be a notification (e.g., a reminder propagated by a schedule, a reminder propagated by an event, a reminder propagated by identification of a potential disruption in the supply chain) to initiate the import agent 2000 (e.g., to execute the import agent 2000 automatically). The ERP modules 2006A-B may be back-end systems to provide data to the import agent 2000 (e.g., the import agent 2000 may query the data from the ERP modules 2006A-B and/or the ERP module 2006A-B may embed the data in the communication 2002). The activities 2008 may be a set of operations (e.g., select, validate, transform, process, and/or publish on the target (e.g., the database 2010)) performed by the import agent 2000 (e.g., on the data aggregated from different systems of the supply chain). The database 2010 may be the target database of the import agent 2000 (e.g., to publish the data aggregated from different systems of the supply chain after performance of the activities 2008).

Figure 21:
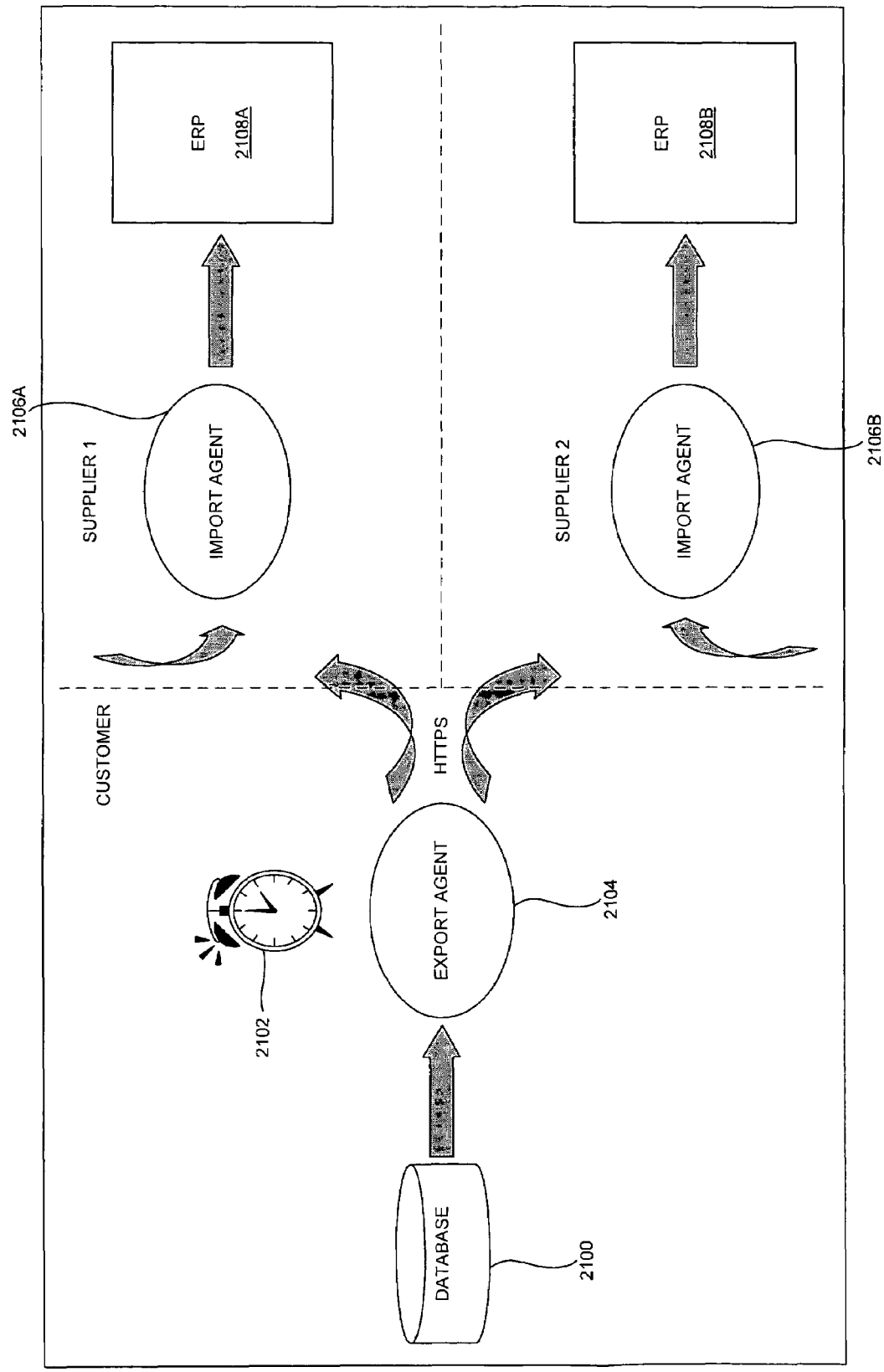
FIG. 21 is an agent view of an export agent communicating with import agents and ERP modules, according to one embodiment.

FIG. 21 is an agent view 2150 of an export agent 2104 communicating with import agents 2106A-B and ERP modules 2108A-B, according to one embodiment. Particularly, FIG. 21 illustrates the agent view 2150, a database 2100, an alarm 2102, the export agent 2104, the import agents 2106A-B, and the ERP modules 2108A-B, according to one embodiment.

The database 2100 may be a relational database to provide data related to an operations chain of an entity (e.g., a customer, a supplier, a manufacturer, etc.) The alarm 2102 may be a notification (e.g., a reminder propagated by a schedule, a reminder propagated by an event, a reminder propagated by identification of a potential disruption in the supply chain) to initiate the export agent 2106 (e.g., to execute the export agent 2104 automatically). The export agent 2104 may be an agent module to aggregate and to process data from different systems in the operations chain (e.g., to initiate the import agents 2106A-B automatically). The import agents 2106A-B may be agent modules (e.g., the import agent 2000 of FIG. 20) to provide aggregate data (e.g., to the export agent 2104) from different systems (e.g., ERP modules 2108A-B). The ERP modules 2108A-B may be back-end systems to provide data to the import agents 2106A-B.

Figure 22:
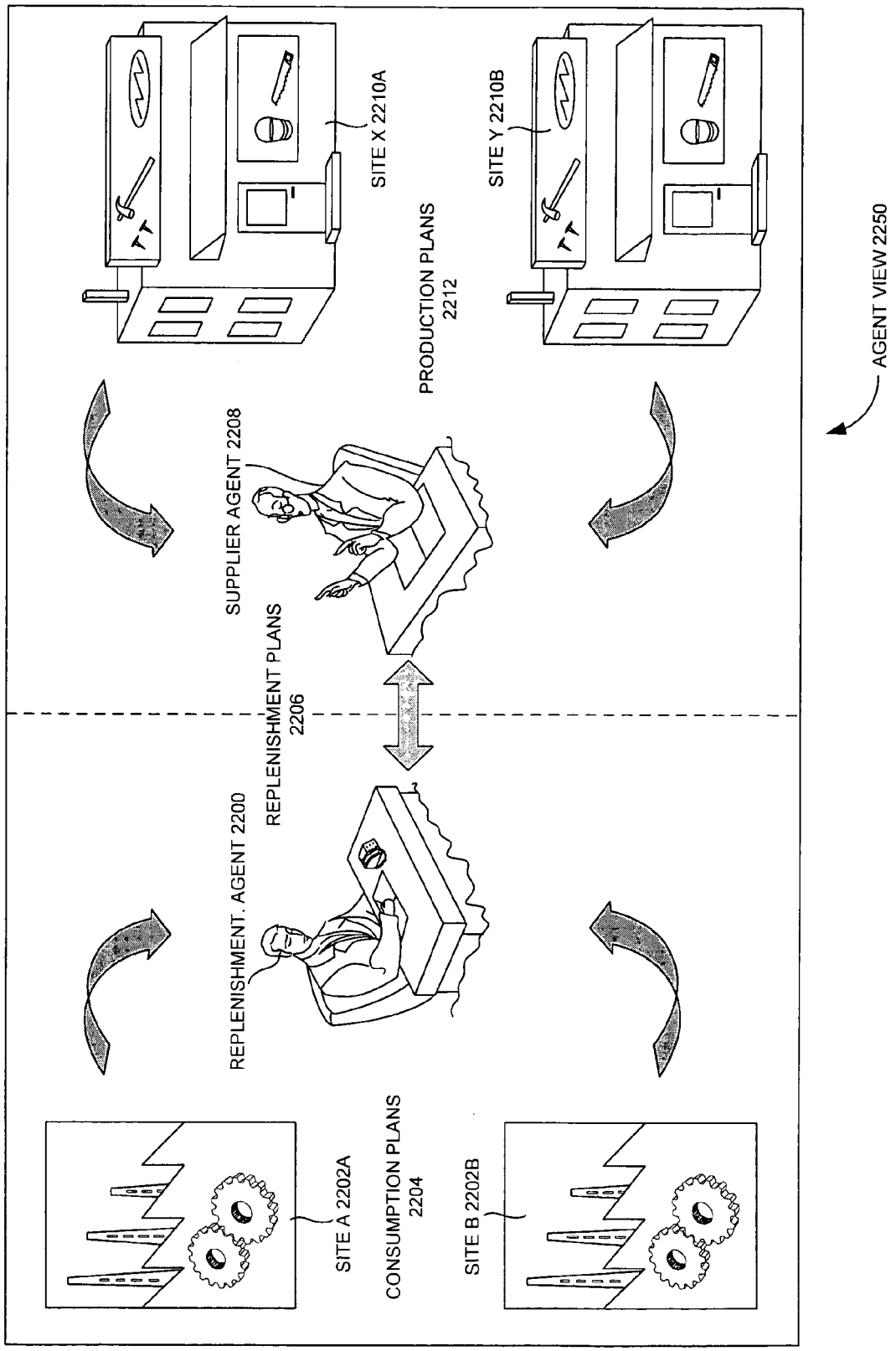
FIG. 22 is an agent view of a replenishment agent communicating with a supplier agent, according to one embodiment.

FIG. 22 is an agent view 2250 of a replenishment agent 2200 communicating with a supplier agent 2202, according to one embodiment. Particularly, FIG. 22 illustrates the replenishment agent 2200, sites 2202A-B, the supplier agent 2204, and sites 2206A-B, according to one embodiment.

The replenishment agent 2200 may be an agent module to make decisions regarding inventory replenishment plans (e.g., based on consumption plans provided by the sites 2202A-B and/or production plans provided by the sites 2206A-B). The sites 2202A-B may be structures (e.g., manufacturing plants, distribution centers, consumer marketplaces, etc.) which provide information of consumption plans of a customer in a supply chain. The supplier agent 2204 may be an agent module to make decisions regarding production plans and to collaborate with the replenishment agent 2200 regarding replenishment plans of the customer. The sites 2206A-B may be structures (e.g., manufacturing plants, distribution centers, consumer marketplaces, etc.) which provide information of production plans of a supplier in a supply chain.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). Similarly, the modules disclosed herein may be enabled using software programming techniques.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method comprising:
providing a data field library;
creating a supply chain node;
associating a particular item of the data field library as a component of the supply chain node through a processor;
automatically defining a relationship between the supply chain node and other supply chain nodes in a multi-level supply chain through linkages of the particular item with other items in the other supply chain nodes as referenced through paired ones of the particular item in different supply chain nodes;
defining a relationship between the supply chain node and the other supply chain nodes in the multi-level supply chain;
enabling a user to drag and drop items of the data field library to the supply chain node;
aggregating various items of the data field library into a grouped set of items, and automatically applying the grouped set of items to the supply chain node;
applying a data structure view to certain ones of the supply chain node and the other supply chain nodes to provide a condensed data structure to a particular entity in the multi-level supply chain; and
organizing the condensed data structure into a customizable set of key performance indicators associated with the particular entity.

2. A method comprising:
associating a supply chain data of a relational database with at least one condensed data structure through a processor;
defining at least one schema of the at least one condensed data structure to describe the supply chain data;
providing a language having an adaptive, modular function oriented syntax specified by expression of the at least one schema;
providing a mapping between the language and a database language to enable interaction with the supply chain data through the processor;
automatically generating a sequence of executable instructions in the database language from a function expressed in the language to apply the function on the supply chain data;
instantiating a dynamic filter of the supply chain data by defining a sequence of instructions expressed in the language to further focus on specific identified criteria to create a collapsible summary table;
configuring a customized view of the supply chain data by defining the sequence of instructions expressed in the language to display a particular arrangement of the supply chain data to create a collapsible view table;
configuring a customized alert to provide a notification of an event of the supply chain data and to enable management of the event, wherein the customized alert is defined in a condensed data structure of the at least one condensed data structure;
defining a set of validation rules of the at least one condensed data structure to compare with and to verify various values in the supply chain data to enable management of a potential disruption in a flow of materials in a supply chain;
defining a set of replenishment rules of the at least one condensed data structure to compare with and to adjust various values in the supply chain data to plan an inventory;
defining a set of policies of the at least one condensed data structure to compare with various values in the supply chain data to optimize the flow of materials in the supply chain;
automatically identifying an inconsistency in the supply chain data to enable management of the potential disruption in the flow of materials in the supply chain;
automatically identifying at least one violation of the validation rules, violation of the replenishment rules, and violation of the policies of the supply chain data to enable management of the potential disruption in the flow of materials in the supply chain;
automatically identifying a conflict in the supply chain data when a particular item exceeds a customizable threshold parameter to enable management of the potential disruption in the flow of materials in the supply chain;
referencing a stored procedure to resolve at least one violation of the replenishment rules, conflict, inconsistency, violation of the validation rules, and violation of the policies; and
automatically resolving at least one inconsistency, conflict, violation of the replenishment rules, violation of the validation rules, and violation of the policies through execution of a series of instructions expressed in the language to manipulate the supply chain data to produce at least one acceptable replacement value, wherein the language is a XML-based language having an adaptive, modular function syntax specified by expression of the at least one schema in the XML schema language, and wherein the database language is SQL such that a mapping between the XML-based language and the SOL to enable automatic generation of a set of executable SQL instructions from a function expressed in the XML-based language.

3. A supply module in a computer comprising:

a business object module communicatively coupled to a processor to define at least one schema to describe a group of data objects associated with a supply chain data;

a XML-based language generator module to process the at least one schema;

a SQL generator module to provide a sequence of SQL instructions to perform a query expressed in the XML-based language;

a schema language module to express the at least one schema to enable the XML-based language generator module to specify a XML-based language;

an environment module of the business object module to create a number of dynamic models of the various environments of a supply chain;

a constraint module of the business object module to define a number of validation rules, a number of replenishment rules, a number of key performance indicators, and a number of policies such that the supply chain data to conform to the number of validation rules, the number of replenishment rules, the number of key performance indicators, and the number of policies;

a view module to enable the development of customizable views, the view module to process a sequence of instructions expressed in the XML-based language to a sequence of SOL instructions to display a particular arrangement of the supply chain data;

an alert module to enable development of customizable alerts, the alert module to process a sequence of instructions expressed in the XML-based language into a sequence of SQL instructions to provide a notification of an event in the supply chain;

a dynamic filter module to enable development of dynamic filters, the dynamic filter module to process a sequence of instructions expressed in the XML-based language into a sequence of SQL instructions to further focus on specific identified criteria;

an application module of a management module to enable development of customizable applications, the application module to select a template from a template library, to select from a component library to embed the template;

a solver module of the management module to provide a solution to a potential disruption in the supply chain through manipulation of the supply chain data;

a component library of the management module including a number of service modules, a number of process modules, and a number of agent modules, each component to perform a set of functions on the supply chain data, wherein at least one component of the component library to incorporate a set of instructions expressed in the XML-based language to perform a set of definable functions on the supply chain data;

a role module to define a set of roles of various users of the supply module such the various users have a limited set of capabilities bases on their role in the supply chain, wherein the role module of the management module to enable assignment of more than one role to a user such that the user has a different set of capabilities associated with each role, and wherein the role module of the management module to limit access to the supply chain data based on a specific role;

an associate module to associate the supply chain data of a relational database with at least one condensed data structure through the server;

the business object module to define the at least one schema of the at least one condensed data structure to describe the supply chain data;

a language module to provide a language having an adaptive, modular function oriented syntax specified by expression of the at least one schema;

a map module to providing a mapping between the language and a database language to enable interaction with the supply chain data through the server;

an mediator module to automatically generate a sequence of executable instructions in the database language from a function expressed in the language to apply the function on the supply chain data;

the dynamic filter module to enable instantiating the dynamic filter of the supply chain data by defining a sequence of instructions expressed in the language to further focus on specific identified criteria to create a collapsible summary table;

the view module to enable configuration of the customized view of the supply chain data by defining the sequence of instructions expressed in the language to display the particular arrangement of the supply chain data to create a collapsible view table;

the alert module to enable configuration of the customized alert to provide a notification of an event of the supply chain data and to enable management of the event, wherein the customized alert is defined in a condensed data structure of the at least one condensed data structure;

the constraint module to define the set of validation rules of the at least one condensed data structure to compare with and to verify various values in the supply chain data to enable management of a potential disruption in a flow of materials in a supply chain;

the constraint module to define the set of replenishment rules of the at least one condensed data structure to compare with and to adjust various values in the supply chain data to plan an inventory;

the constraint module to define the set of policies of the at least one condensed data structure to compare with various values in the supply chain data to optimize the flow of materials in the supply chain;

an inconsistency check module to automatically identify an inconsistency in the supply chain data to enable management of the potential disruption in the flow of materials in the supply chain;

a validation check module to automatically identify at least one violation of the validation rules, violation of the replenishment rules, and violation of the policies of the supply chain data to enable management of the potential disruption in the flow of materials in the supply chain;

a conflict check module to automatically identify a conflict in the supply chain data when a particular item exceeds a customizable threshold parameter to enable management of the potential disruption in the flow of materials in the supply chain;

a solution module to enable referencing a stored procedure to resolve at least one violation of the replenishment rules, conflict, inconsistency, violation of the validation rules, and violation of the policies; and a resolve module to automatically resolve at least one inconsistency, conflict, violation of the replenishment rules, violation of the validation rules, and violation of the policies through execution of a series of instructions expressed in the language to manipulate the supply chain data to produce at least one acceptable replacement value, wherein the language is the XML-based language having an adaptive, modular function syntax specified by expression of the at least one schema in the XML schema language, and wherein the database language is SQL such that a mapping between the XML-based language and the SQL to enable automatic generation of a set of executable SQL instructions from a function expressed in the XML-based language.

* * * * *